US009880834B2

(12) United States Patent
Sakamoto

(10) Patent No.: US 9,880,834 B2
(45) Date of Patent: Jan. 30, 2018

(54) SOURCE PROGRAM ANALYSIS SYSTEM, SOURCE PROGRAM ANALYSIS METHOD, AND RECORDING MEDIUM ON WHICH PROGRAM IS RECORDED

(71) Applicant: NEC Solution Innovators, Ltd., Tokyo (JP)

(72) Inventor: Hisashi Sakamoto, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 100 days.

(21) Appl. No.: 14/781,122

(22) PCT Filed: Mar. 24, 2014

(86) PCT No.: PCT/JP2014/058021
§ 371 (c)(1),
(2) Date: Sep. 29, 2015

(87) PCT Pub. No.: WO2014/157056
PCT Pub. Date: Oct. 2, 2014

(65) Prior Publication Data
US 2016/0054994 A1  Feb. 25, 2016

(30) Foreign Application Priority Data

Mar. 29, 2013  (JP) .................................. 2013-074623

(51) Int. Cl.
G06F 9/44  (2006.01)
G06F 9/445  (2006.01)
G06F 17/30  (2006.01)

(52) U.S. Cl.
CPC ................ *G06F 8/70* (2013.01); *G06F 8/751* (2013.01); *G06F 9/44505* (2013.01);
(Continued)

(58) Field of Classification Search
CPC ............ G06F 8/20–8/78; G06F 9/44–9/44594
See application file for complete search history.

(56) References Cited

U.S. PATENT DOCUMENTS 8,578,348 B2 * 11/2013 Fliess ........................ G06F 8/70
 717/135
8,627,290 B2 * 1/2014 Clee .......................... G06F 8/71
 717/125
(Continued)

FOREIGN PATENT DOCUMENTS

CN 102681835 9/2012
JP 2003-216425 7/2003
(Continued)

OTHER PUBLICATIONS

Ducasse, Stephane et al., "A Language Independent Approach for Detecting Duplicated Code," 1999, pp. 1-10.*
(Continued)

*Primary Examiner* — Thuy Dao
*Assistant Examiner* — Christopher Franco
(74) *Attorney, Agent, or Firm* — Young & Thompson

(57) ABSTRACT

A matching portion detector detects matching portions the respective contents of which match each other, in a source program. A similar portion detector detects, on the basis of the matching portions detected by the matching portion detector, similar portions each containing a part that matches a part of another similar portion and another part that does not match, and each satisfying a criterion, in the source program. A non-matching portion analyzer analyzes the similar portion detected by the similar portion detector, and outputs an index indicating a degree of similarity between the similar portion and another similar portion that partially match each other.

16 Claims, 20 Drawing Sheets

(52) U.S. Cl.
CPC .. *G06F 17/30312* (2013.01); *G06F 17/30424* (2013.01); *G06F 8/20* (2013.01); *G06F 8/74* (2013.01)

(56) References Cited

U.S. PATENT DOCUMENTS

| | | | | |
|---|---|---|---|---|
| 9,110,769 | B2* | 8/2015 | Zhang | G06F 8/751 |
| 9,201,649 | B2* | 12/2015 | Cheluvaraju | G06F 8/75 |
| 9,569,207 | B2* | 2/2017 | Km | G06F 8/73 |
| 2006/0004528 | A1 | 1/2006 | Uehara et al. | |
| 2010/0199263 | A1* | 8/2010 | Clee | G06F 8/71 717/125 |
| 2011/0246968 | A1* | 10/2011 | Zhang | G06F 8/751 717/125 |
| 2012/0060142 | A1* | 3/2012 | Fliess | G06F 8/70 717/102 |
| 2012/0159434 | A1* | 6/2012 | Dang | G06F 8/751 717/120 |
| 2012/0272207 | A1* | 10/2012 | Lerner | G06F 8/71 717/102 |
| 2014/0123108 | A1* | 5/2014 | Cheluvaraju | G06F 8/75 717/123 |
| 2014/0337820 | A1* | 11/2014 | Km | G06F 8/73 717/123 |

FOREIGN PATENT DOCUMENTS

| | | |
|---|---|---|
| JP | 2006-018693 | 1/2006 |
| JP | 2012-164211 | 8/2012 |

OTHER PUBLICATIONS

Kamiya, Toshihiro et al., "CCFinder: A Multilinguistic Token-Based Code Clone Detection System for Large Scale Source Code," 2002, pp. 654-670.*

Holmes, Reid et al., "Using Structural Context to Recommend Source Code Examples," 2005, pp. 117-125.*

Ying, Annie T.T. et al., "Predicting Source Code Changes by Mining Change History," 2005, pp. 574-586.*

Park, Seongsoo et al., "Detecting Source Code Similarity Using Code Abstraction," 2013, pp. 1-9.*

Lau, Jeremy et al., "Selecting Software Phase Markers with Code Structure Analysis," 2006, pp. 1-12.*

Yoshiki Higo, Shinji Kusumoto, and Katsuro Inoue, "A Survey of Code Clone Detection and Its Related Techniques", The Institute of Electronics, Information and Communication Engineers, Transactions D, vol. J91-D, No. 6 (2008), pp. 1465-1481.

Yasushi Ueda et al., 'On Detection of Gapped Code Clones using Gap Locations' Proceedings of the Ninth Asia-Pacific Software Engineering Conference (APSEC'02), Dec. 6, 2002, pp. 327-336.
International Search Report PCT/JP2014/058021 dated Jun. 10, 2014.
http://www.ccfinder.net/.
Chinese Official Action—201480019304.0—dated Oct. 26, 2017.

* cited by examiner

| CODE CLONE ID | GROUP ID | FILE NAME | INITIAL LINE NUMBER | END LINE NUMBER |
|---|---|---|---|---|
| T2101 | T2102 | T2103 | T2104 | T2105 |
|  |  |  |  |  |

| PROGRAM LANGUAGE TYPE | GRAMMAR DEFINITION |
|---|---|
| T2201 | T2202 |
|  |  |

| RUN UNIT ID | RUN UNIT TYPE | START/END PROPERTY | FILE NAME | INITIAL LINE NUMBER | END LINE NUMBER |
|---|---|---|---|---|---|
| T2301 | T2302 | T2303 | T2304 | T2305 | T2306 |
|  |  |  |  |  |  |

| SIMILAR PORTION ID | SIMILAR PORTION GROUP ID | FILE NAME | INITIAL LINE NUMBER | END LINE NUMBER | MATCHING PORTION LIST |
|---|---|---|---|---|---|
| T2401 | T2402 | T2403 | T2404 | T2405 | T2406 |
|  |  |  |  |  |  |

| SIMILAR PORTION ID | SIMILAR PORTION GROUP ID | NON-MATCHING PORTION SYNTACTIC STRUCTURE | NON-MATCHING PORTION COMMON SYNTACTIC STRUCTURE | NON-MATCHING PORTION SYNTAX SIMILARITY |
|---|---|---|---|---|
| T2501 | T2502 | T2503 | T2504 | T2505 |
|  |  |  |  |  |

FIG. 9

```
00: main(int args, char** argv)
01: {
02:   int a,b,c;
03:   int d = 0;
04:
05:   a=10;
06:   b=20;
07:   c=30;
08:   d= calc(a,b,c) ;
09:   print( "result:%d¥n",d);
10:
11:   a=10;
12:   b=20;
13:   c= a+b+15;
14:   d= calc(a,b,c);
15:   print( "result:%d¥n",d);
16:
17:   return;
18: }
```

FIG. 12

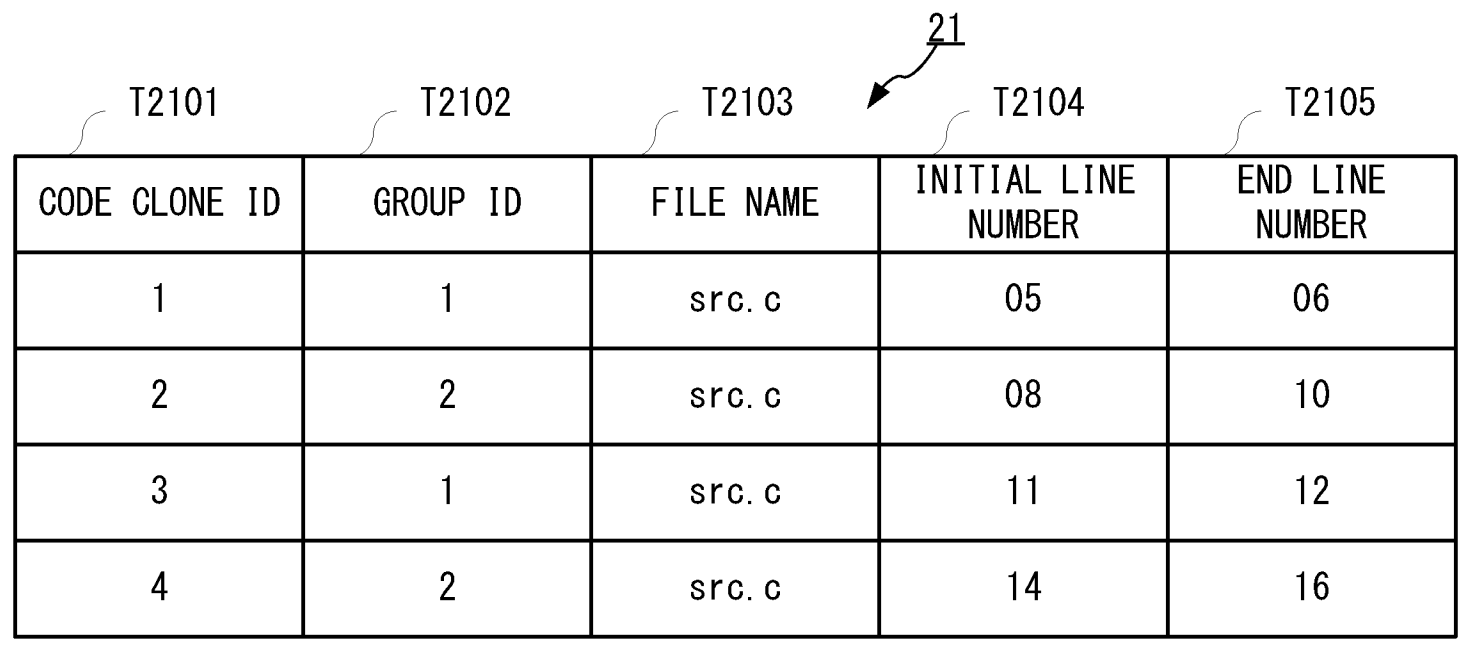

| CODE CLONE ID | GROUP ID | FILE NAME | INITIAL LINE NUMBER | END LINE NUMBER |
|---|---|---|---|---|
| 1 | 1 | src.c | 05 | 06 |
| 2 | 2 | src.c | 08 | 10 |
| 3 | 1 | src.c | 11 | 12 |
| 4 | 2 | src.c | 14 | 16 |

| PROGRAM LANGUAGE TYPE (T2201) | GRAMMAR DEFINITION (T2202) |
|---|---|
| .c | START OF FUNCTION: {<br>END OF FUNCTION: }<br>VARIABLE: [a-z]*<br>NUMERICAL VALUE: [0-9]*<br>OPERATOR: + \| - \| * \| /<br>SUBSTITUTION OPERATOR: =<br>EQUATION: VARIABLE\|NUMERICAL VALUE<br>(OPERATOR VARIABLE\|NUMERICAL VALUE\|EQUATION)<br>SUBSTITUTION: VARIABLE SUBSTITUTION OPERATOR EQUATION |

FIG. 15

| RUN UNIT ID (T2301) | RUN UNIT TYPE (T2302) | START/END PROPERTY (T2303) | FILE NAME (T2304) | INITIAL LINE NUMBER (T2305) | END LINE NUMBER (T2306) |
|---|---|---|---|---|---|
| 1 | FUNCTION | START | src.c | 01 | 01 |
| 2 | FUNCTION | END | src.c | 18 | 18 |

| SIMILAR PORTION ID T2401 | SIMILAR PORTION GROUP ID T2402 | FILE NAME T2403 | INITIAL LINE NUMBER T2404 | END LINE NUMBER T2405 | MATCHING PORTION LIST T2406 |
|---|---|---|---|---|---|
| 1 | 1 | src.c | 05 | 10 | 1, 2 |
| 2 | 1 | src.c | 11 | 16 | 3, 4 |
| 3 | 2 | src.c | 02 | 07 | 1 |
| 4 | 3 | src.c | 07 | 10 | 2 |
| 5 | 2 | src.c | 11 | 13 | 3 |
| 6 | 3 | src.c | 13 | 16 | 4 |

24

SOURCE PROGRAM ANALYSIS SYSTEM, SOURCE PROGRAM ANALYSIS METHOD, AND RECORDING MEDIUM ON WHICH PROGRAM IS RECORDED

TECHNICAL FIELD

The present disclosure relates to a source program analysis system, a source program analysis method, and a non-transitory recordable medium on which a program is recorded.

BACKGROUND ART

Nowadays, numerous companies and organizations are utilizing large-scaled computer systems for various purposes. When running a large-scaled computer system, it is necessary to perform maintenance works such as fixing a bug of software in operation and adding a required function. The companies and organizations that utilize the computer system need to accurately recognize the cost for such maintenance work.

A technique of estimating the maintenance cost of software from positions or the number of code clones is known. The code clone refers to a partial copy created on a source code of a program. It is known that, in general, the presence of a large number of code clones leads to decline of maintenance performance of the software. This is because, for example when a bug is found in the code clone, the developer has to review whether each of the code clones having the same content has to be fixed in order to eliminate the bug. In a large-scaled system, in particular, it takes enormous man power to review all the code clones contained in the software.

Various studies have thus far been made on detection of the code clone. Non Patent Literature 1 classifies the code clone into the following three types. The type 1 includes code clones that fully match except for blanks, parenthesis, and the like. The type 2 includes code clones different that are different from each other only in a part of reserved words, for example a user-defined name such as a variable name, a label name, and a procedure name, and a type of the variable. The type 3 includes those code clones of type 2 but in which a sentence has been inserted, deleted, or modified. Non Patent Literature 1 discloses a technique of detecting the code clone of types 1 and 2.

Non Patent Literature 2 discloses a system and software to detect the code clone. The software disclosed by Non Patent Literature 2 (CC Finder X) lexically analyzes the source program to be processed, and detects the code clone contained in the source program. The software is capable of detecting the code clone of types 1 and 2.

Patent Literature 1 discloses a system for detecting the code clone with respect to each function and evaluating the similarity between the code clones. The system according to Patent Literature 1 analyzes the source program with respect to each function, and detects the code clone that satisfies a similarity detection criterion designated by the user. The user can instruct to detect either the code clones that fully match (type 1), or those partially different from each other (type 2 or type 3). The system according to Patent Literature 1 also evaluates the detected code clones according to two viewpoints, which are whether the corresponding source codes match and whether the function interface is identical, and classifies the code clones into four categories according to the evaluation result. The user can find, by looking up the category, for example whether there are other code clones that are different only in function interface, or whether there are other code clones of the identical source code, which is useful for reutilization of the code clone.

CITATION LIST

Patent Literature

Patent Literature 1: Unexamined Japanese Patent Application Kokai Publication No. 2012-164211

Non Patent Literature

Non Patent Literature 1: Yoshiki HIGO, Shinji KUSU-MOTO, and Katsuro INOUE, "A Survey of Code Clone Detection and Its Related Techniques" The Institute of Electronics, Information and Communication Engineers, Transactions D, VOL. J91-D, No6 (2008), pp. 1465-1481.
Non Patent Literature 2: CC Finder Homepage (URL: http://www.ccfinder.net)

SUMMARY OF INVENTION

Technical Problem

The techniques disclosed in the foregoing Literatures have the drawback in that effective information for calculating the maintenance cost of the code clones in which a sentence has been inserted, deleted, or modified.

To be more detailed, Non Patent Literatures 1 and 2 do not provide a technique of detecting the code clones in which a sentence has been inserted, deleted, or modified. When the developer copies a part of the source program to reutilize that part in the software development, the copied part is more often modified than being utilized as it is. Accordingly, the code clones of type 3 also have to be encompassed as targets when the software is to be amended or improved. From such viewpoint, the code clone detection with the technique according to Non Patent Literatures 1 and 2 is insufficient. In addition, Non Patent Literatures 1 and 2 do not provide a technique of evaluating the similarity and maintainability of the detected code clone. Therefore, the techniques according to the cited Literatures are unable to provide information that serves as an index for estimating the cost of the maintenance work for the detected code clone.

Although the technique according to Patent Literature 1 allows the code clone to be detected with respect to each function, a code clone partially contained in the function is unable to be detected. In the maintenance of software it is often necessary to amend the code clone partially contained in the function, in which case the technique according to Patent Literature 1 is unable to output sufficient information. In addition, a source program described in a program language free from a function is unable to be analyzed, either. Further, the system according to Patent Literature 1 evaluates the detected code clones according to two viewpoints, namely whether the corresponding source codes match and whether the function interface is identical. However, the index based on the two viewpoints only indicate the degree of similarity between the code clones, and are unable to indicate which of the code clones should be modified to which extent, to amend or improve the software. Therefore, the technique according to Patent Literature 1 is unable to provide effective information for calculating the maintenance cost of the software.

The present disclosure has been accomplished in view of the foregoing problem, with an objective to provide a source program analysis system and a source program analysis method capable of detecting a code clone in which a sentence has been inserted, deleted, or modified, and outputting effective information for calculating the modification cost of the program on the basis of the detected code clone, and a non-transitory recordable medium on which the program is recorded.

Solution to Problem

To achieve the foregoing objective, a first aspect of the present disclosure provides a source program analysis system including:
a matching portions detector which detects matching portions in a source program, respective contents of which match each other;
a similar portions detector which detects similar portions in the source program, each containing a part that matches a part of another similar portion and another part that does not match, and each satisfying a criterion, on a basis of the matching portions detected by the matching portions detector; and
a non-matching portion analyzer which analyzes the similar portion detected by the similar portions detector, and outputs an index indicating a degree of similarity between the similar portion and another similar portion that partially match each other.

To achieve the foregoing objective, a second aspect of the present disclosure provides a source program analysis method including:
detecting matching portions in a source program, respective contents of which match each other; detecting similar portions in a source program, each containing a part that matches a part of another similar portion and another part that does not match, on a basis of the detected matching portions, and satisfying a criterion; and
analyzing the detected similar portion and outputting an index indicating a degree of similarity between the similar portion and another similar portion that partially match each other.

To achieve the foregoing objective, a third aspect of the present disclosure provides a non-transitory recordable medium on which a program is recorded, the program being configured to cause a computer to realize:
a matching portion detection function including detecting matching portions in a source program, respective contents of which match each other;
a similar portion detection function including detecting similar portions in a source program, each containing a part that matches a part of another similar portion and another part that does not match, on a basis of the matching portions detected by the matching portion detection function, and satisfying a criterion; and
a non-matching portion analysis function including analyzing the similar portion detected by the similar portion detection function, and outputting an index indicating a degree of similarity between the similar portion and another similar portion that partially match each other.

Advantageous Effects of Invention

With the present disclosure, a source program analysis system and a source program analysis method can be obtained by which a code clone in which a sentence has been inserted, deleted, or modified can be detected, and effective information for calculating the modification cost of the program can be outputted on the basis of the detected code clone, and also a recording medium on which the program is recorded can be obtained.

BRIEF DESCRIPTION OF DRAWINGS

FIG. 4 is a table showing content of a matching portion information DB;
FIG. 5 is a table showing content of a grammar definition information DB;
FIG. 6 is a table showing content of a run unit indicator information DB;
FIG. 7 is a table showing content of a similar portion information DB;
FIG. 8 is a table showing content of a non-matching structure information DB;
FIG. 9 is a drawing showing the source program according to the exemplary embodiment;
FIG. 12 is a table showing the content of the matching portion information DB after the matching portion detection process;
FIG. 14 is a table showing the content of the grammar definition information DB looked up in the run unit indicator detection process;
FIG. 15 is a table showing the content of the run unit indicator information DB after the run unit indicator detection process;
FIG. 19 is a table showing the content of the similar portion information DB after the similar portion detection process.

DESCRIPTION OF EMBODIMENTS

Hereafter, an exemplary embodiment of the present disclosure will be described with reference to the drawings.

Exemplary Embodiment

A source program analysis system according to the exemplary embodiment of the present disclosure is designed to analyze a source program, detect code clones in which a sentence has been inserted, deleted, or modified (in other words, containing a non-matching portion), analyze the program structure of the non-matching portion of the detected code clone, and output an index regarding similarity. A user can look up the index regarding the similarity, and calculate the modification cost of the program.

Figure 1:
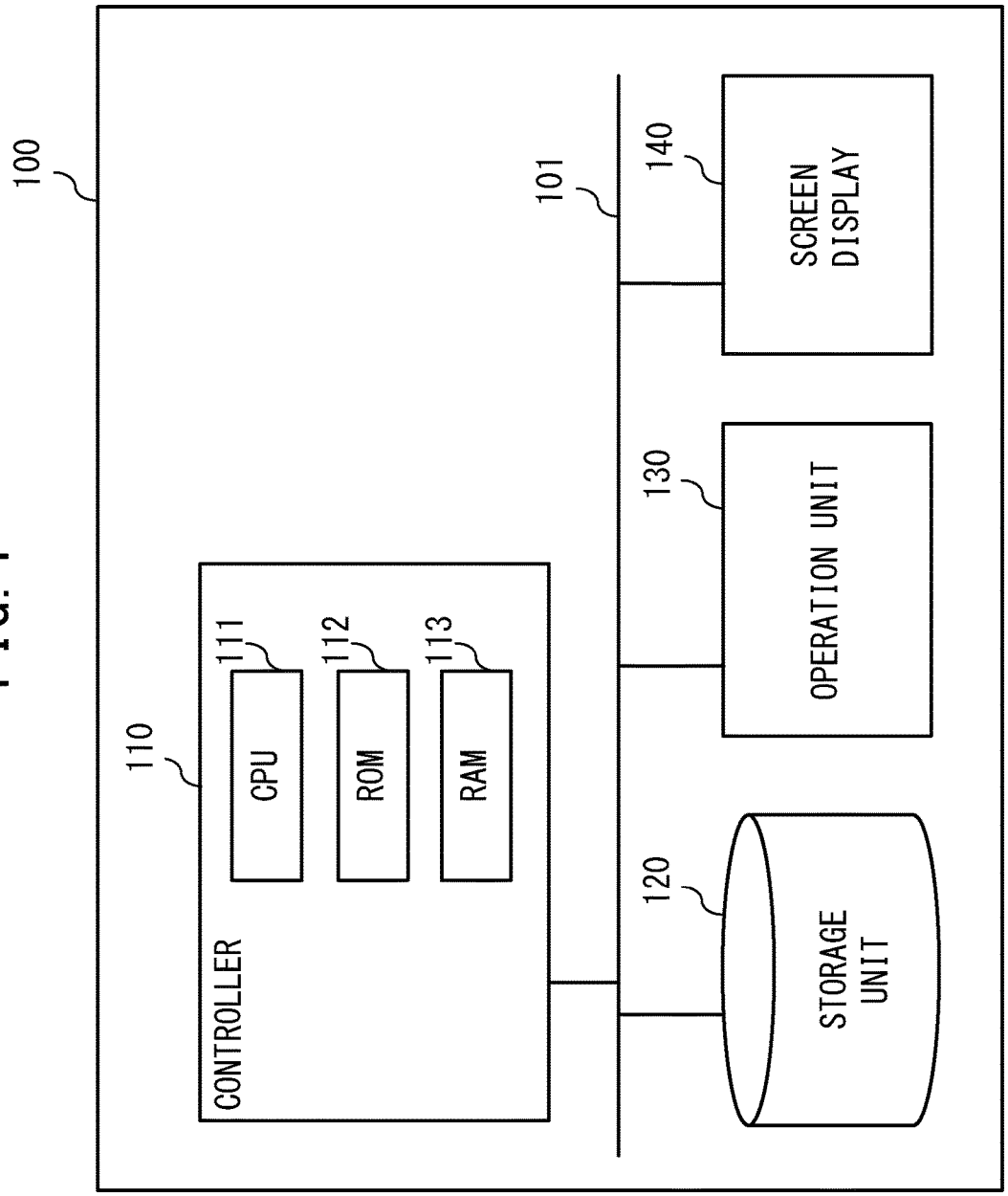
FIG. 1 is a block diagram showing a hardware configuration of a source program analysis system according to an exemplary embodiment of the present disclosure.

The source program analysis system 100 according to this exemplary embodiment includes, as shown in FIG. 1, a controller 110, a storage unit 120, an operation unit 130, and a screen display 140. The cited constituents of the source program analysis system 100 are connected to one another via a bus 101.

The controller 110 includes a central processing unit (CPU) 111, a read-only memory (ROM) 112, and a random-access memory (RAM) 113. The CPU 111 controls the overall operation of the source program analysis system 100 in accordance with a control program stored in the ROM 112. The ROM 112 contains the control program. The RAM 113 temporarily stores data to be utilized by the CPU 111. The controller 110 controls the mentioned constituents in the source program analysis system 100 by exchanging signals with the constituents through the bus 101.

The storage unit 120 includes a hard disk, a solid state drive (SSD), a CD-ROM (Compact Disc-Read Only Memory) and the like, and stores information necessary for the source program analysis system 100 to perform the operation.

The operation unit 130 receives inputs made by the user, and transmits the inputs to the controller 110 as information. The operation unit 130 includes, for example, a mouse, a keyboard, a touch panel, and so forth.

The screen display 140 displays information to be displayed by the source program analysis system 100 to the user, for example in a form of an operation screen and a result display screen, under the control of the controller 110. The screen display 140 is constituted of a liquid crystal display, an organic electroluminescence display, or the like.

Figure 2:
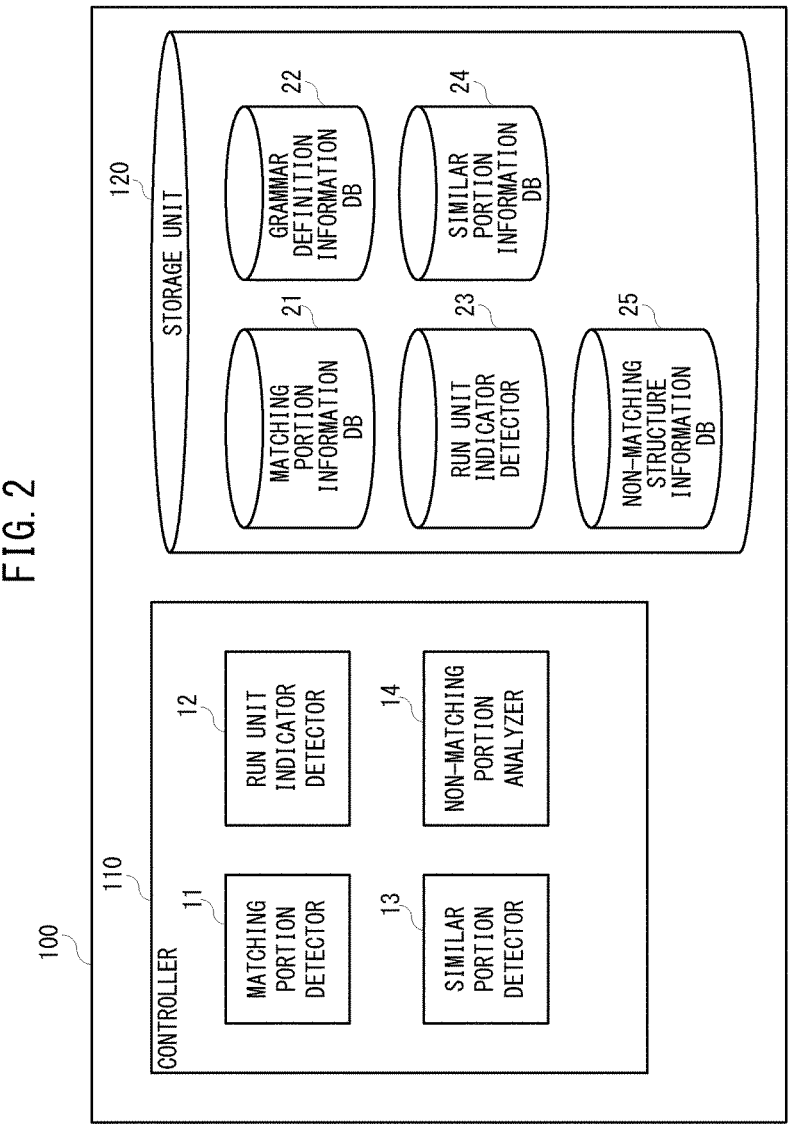
FIG. 2 is a block diagram showing functions of the source program analysis system.

When the source program analysis system 100 works, the controller 110 serves as a matching portion detector 11, a run unit indicator detector 12, a similar portion detector 13, and a non-matching portion analyzer 14, as shown in FIG. 2. The storage unit 120 serves as a matching portion information database (hereinafter, DB) 21, a grammar definition information DB 22, a un unit indicator information DB 23, a similar portion information DB 24, and a non-matching structure information DB 25.

Figure 3:
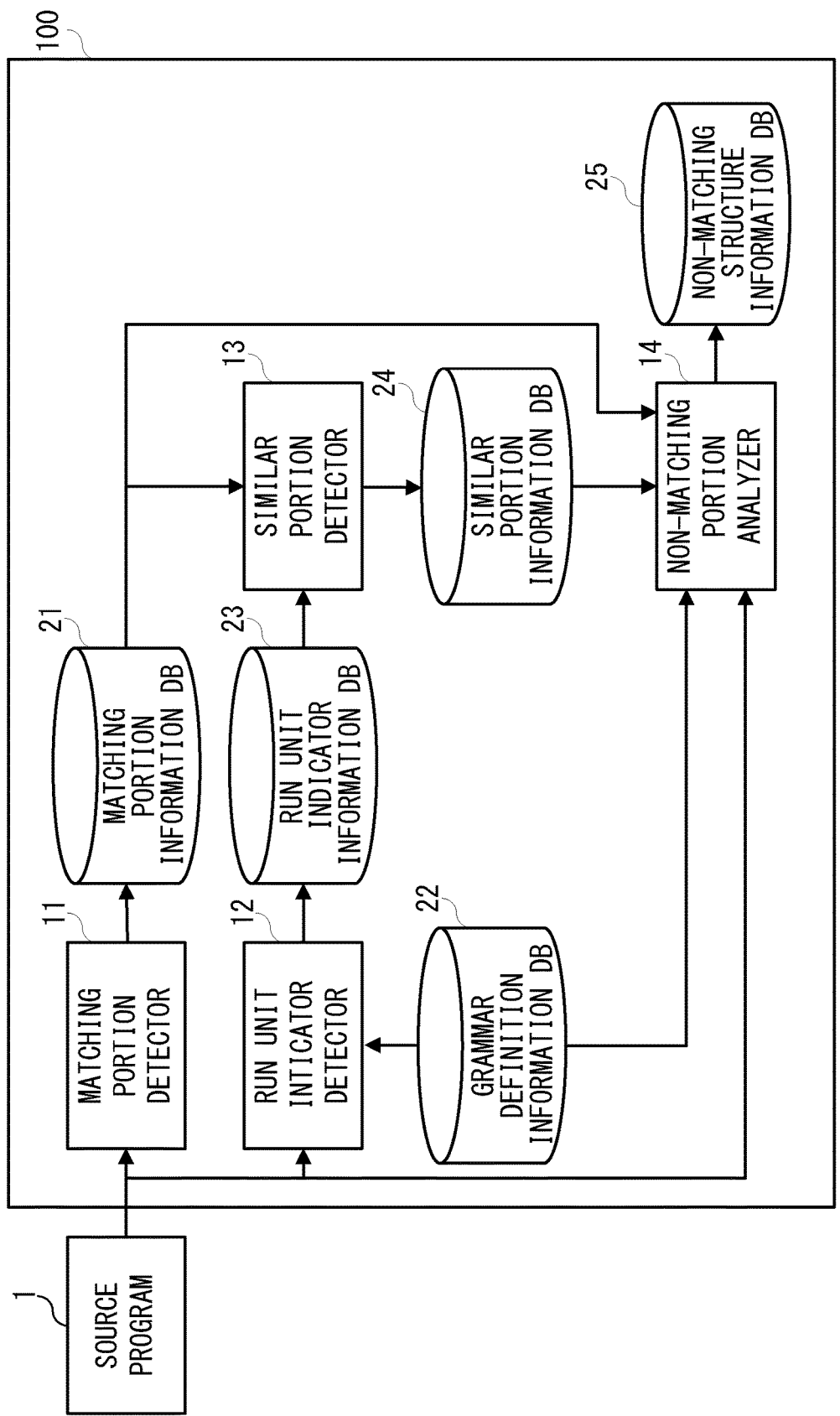
FIG. 3 is a block diagram showing a flow of data in the source program analysis system.

Referring now to FIG. 3, the function and operation of the constituents shown in FIG. 2 will be described. As a general outline, the source program analysis system 100 detects the code clones in the source program 1, and records the index indicating the similarity between the detected code clones in the non-matching structure information DB 25.

The matching portion detector 11 detects matching portions the respective contents of which match each other, in the source program 1. Such matching portions correspond to the code clones of type 1 or type 2 referred to earlier. The matching portion detector 11 generates matching portion information with respect to each of the detected matching portions, and records the generated matching portion information in the matching portion information DB 21. To realize the function of the matching portion detector 11, for example the technique and the software disclosed in Non Patent Literature 2 can be employed. In this exemplary embodiment, CC finder X which is an example of the software disclosed in Non Patent Literature 2 will be utilized. The matching portion detector 11 analyzes each line of the source program 1 to detect the matching portions with respect to each line, and identifies the position of the detected matching portions with an initial line number and an end line number in the source program. Here, the term "line" refers to a group of codes in a portion interposed between the codes indicating CR+LF, in the source program.

The run unit indicator detector 12 detects an indicator indicating start or finish of a run unit of the inputted source program on the basis of a grammar definition recorded in the grammar definition information DB 22, generates run unit indicator information, and records the run unit indicator information in the run unit indicator information DB 23. Here, the term "run unit" refers to a unit that serves as a reference for dividing the program, for example a section, a division, a paragraph, a procedure (sub routine), a function, and a block or the like, defined by syntactic regulation of each program language.

The similar portion detector 13 detects similar portions that satisfy a criterion in the source program on the basis of the matching portion information recorded in the matching portion information DB 21, generates similar portion information regarding the detected similar portion, and records the generated similar portion information in the similar portion information DB 24. The similar portion detector 13 identifies the position of the detected similar portions with the initial line number and the end line number in the source program. The similar portion detector 13 detects portions that match one of the following two patterns, as similar portion that satisfies the criterion.

The similar portion of a first pattern comprises a plurality of matching portions and one or more portions interposed therebetween. Such a similar portion contains the matching portions located on the respective end portions and the non-matching portion that does not match a part of another similar portion, and corresponds to the code clone in which a sentence has been inserted, deleted, or modified (type 3). To detect the similar portion of the first pattern, the similar portion detector 13 looks up the matching portion information recorded in the matching portion information DB 21, and detects such portions in the source program where a plurality of matching portions are aligned in the same order of appearance without another matching portion being interposed. Then the similar portion detector 13 extracts the portion containing the plurality of matching portions that have been detected and the one or more portions interposed between the matching portions, as one similar portion (of the first pattern).

The similar portion of a second pattern comprises a matching portion, a non-matching portion immediately anterior to the matching portion (preceding portion), and a non-matching portion immediately posterior to the matching portion (following portion) in the source program. Such a similar portion contains the matching portion and the preceding or following non-matching portion, and hence corresponds to the code clone in which a sentence has been inserted, deleted, or modified. The similar portion detector 13 looks up the matching portion information recorded in the matching portion information DB 21 and the run unit indicator information recorded in the run unit indicator information DB 23, and detects the preceding portion and the following portion of each matching portion. Here, the term "preceding portion" refers to a portion between a predetermined delimiter and the initial line of the matching portion, and "following portion" refers to a portion between the end line of the matching portion and a predetermined delimiter. The predetermined delimiter is a closest delimiter to the matching portion, among the initial lines or end lines of the run unit indicator or another matching portion. When detecting the similar portion of the second pattern, the similar portion detector 13 extracts as similar portion the section containing the preceding portion, the matching portion, and the following portion, with respect to the matching portion with which the preceding portion or following portion has been detected. In the case where only the preceding portion is detected with the matching portion, the similar portion detector 13 extracts the section containing the preceding portion and the matching portion, as similar portion. When only the following portion is detected with the matching portion, the similar portion detector 13 extracts the section containing the matching portion and the following portion, as similar portion.

The non-matching portion analyzer 14 analyzes the similar portion recorded in the similar portion information DB 24, and records an index indicating the degree of similarity between the similar portion and another similar portion each containing a part that matches a part of another similar portion, in the non-matching structure information DB 25. To be more detailed, the non-matching portion analyzer 14 reads out the position of the similar portion and the matching portion list included in the similar portion from the similar portion information DB 24, and also reads out the position of the matching portion from the matching portion information DB 21, to thereby identify the position of the non-matching portion in the similar portion. The non-matching portion analyzer 14 reads out the program description of the identified position of the non-matching portion, from the source program 1. The non-matching portion analyzer 14 then syntactically analyzes the program description thus read out according to the grammar definition recorded in the grammar definition information DB 22, and acquires a syntactic structure. The non-matching portion analyzer 14 compares the acquired syntactic structure, and detects a syntactic structure that is common to the non-matching portions of the respective similar portions (non-matching portion common syntactic structure). The non-matching portion analyzer 14 compares between the syntactic structure of the non-matching portions of the respective similar portions and the non-matching portion common syntactic structure, and calculates the degree of similarity as syntactic similarity. In the syntactic analysis, the non-matching portion analyzer 14 utilizes a left-to-right (LR) scanning method to analyze the program description of the non-matching portion, and acquires the syntactic structure expressed by a syntax tree.

The matching portion information DB 21 shown in FIG. 3 contains the items of code clone ID (T2101), group ID (T2102), file name (T2103), initial line number (T2104), and end line number (T2105), as shown in FIG. 4. The code clone ID is identification information uniquely given to the matching portion (code clone of type 1 or type 2) detected by the matching portion detector 11 in the source program 1. The group ID is identification information indicating the group to which the matching portion belongs. The matching portions that belong to the same group have the identical content. The file name represents the name of the file on the source program 1. The initial line number represents the number of the first line of the section corresponding to the matching portion in the source program 1. The end line number represents the number of the last line of the section corresponding to the matching portion in the source program 1.

The grammar definition information DB 22 shown in FIG. 3 contains the items of program language type (T2201) and grammar definition (T2202) as shown in FIG. 5. The program language type is information indicating to which program language the grammar definition, to be subsequently described, corresponds. The program language type is expressed as, for example, "C (C language)" or "JAVA (registered trademark)". The grammar definition is information defining the grammar of the program language shown as program language type. The grammar definition describes, for example, how a code indicating the start of a function, a code indicating the end of the function, a range of variables, a numerical value range, type and code of an operator, a code indicating a substitution operator, a format of an equation, and a format of an assignment expression are stipulated in the relevant program language.

The run unit indicator information DB 23 shown in FIG. 3 contains, as shown in FIG. 6, the items of run unit indicator ID (T2301), run unit type (T2302), start/end property (T2303), file name (T2304), initial line number (T2305), and end line number (T2306). The run unit indicator ID is identification information added to a code (indicator) indicating the start or finish of the run unit detected by the run unit indicator detector 12 in the source program 1. The run unit indicator type is information indicating to which of the run units such as a section, a division, a paragraph, a procedure (sub routine), a function, and a block, or the like, the detected code corresponds. The start/end property is information indicating whether the detected code corresponds to the start of the run unit or the end of the run unit. The file name represents the name of the file on the source program 1. The initial line number represents the number of the line where the detected code starts. The end line number represents the number of the line where the detected code ends.

The similar portion information DB 24 shown in FIG. 3 contains the similar portion information comprising similar portion ID (T2401), similar portion group ID (T2402), file name (T2403), initial line number (T2404), end line number (T2405), and matching portion list (T2406), as shown in FIG. 7. The similar portion ID (T2401) is identification information uniquely given to the similar portion detected by the similar portion detector 13 in the source program 1. The similar portion group ID (T2402) is information indicating the similar portion group to which the similar portion belongs. The similar portions that belong to the same similar portion group contain the matching portions that belong to the same group. The file name (T2403) represents the name of the file on the source program 1. The initial line number (T2404) represents the number of the line where the detected similar portion starts. The end line number (T2405) represents the number of the line where the detected similar portion ends. The matching portion list (T2406) indicates the code clone ID of the matching portion contained in the relevant similar portion. The matching portion list contains the code clone IDs in the matching portion, listed in the order of appearance.

The non-matching structure information DB 25 shown in FIG. 3 contains the non-matching structure information comprising similar portion ID (T2501), similar portion group ID (T2502), non-matching portion syntactic structure (T2503), non-matching portion common syntactic structure (T2504), and non-matching portion syntactic similarity (T2505), as shown in FIG. 8. The similar portion ID (T2501) is identification information for identifying the similar portion. The similar portion group ID (T2502) is identification information for identifying the group of the similar portion. The non-matching portion syntactic structure (T2503) represents the syntactic structure of the non-matching portion contained in the similar portion. The non-matching portion syntactic structure is recorded as data expressed by a layered structure based on an extensible markup language (XML) or a document object model (DOM) method, or the like, or as binary data. The non-matching portion common syntactic structure (T2504) represents the syntactic structure that is common to the non-matching portions of the respective similar portions having the same similar portion group ID (non-matching portion common syntactic structure). The non-matching portion common syntax is recorded as data expressed by a layered structure based on XML or DOM, or the like, or as binary data. The non-matching portion syntactic similarity (T2505) is a numerical index indicating the degree of similarity between the non-matching portion of the similar portion and the non-matching portion common syntactic structure. More specifically, the index is expressed by a ratio of the nodes that are common to the non-matching portion common syntactic structure in the non-matching portion syntactic structure expressed by the layered structure, with respect to the total number of nodes.

Hereunder, an operation of the source program analysis system 100 for analyzing the source program will be described, with reference to a source program shown in FIG. 9 as an example.

Figure 10:
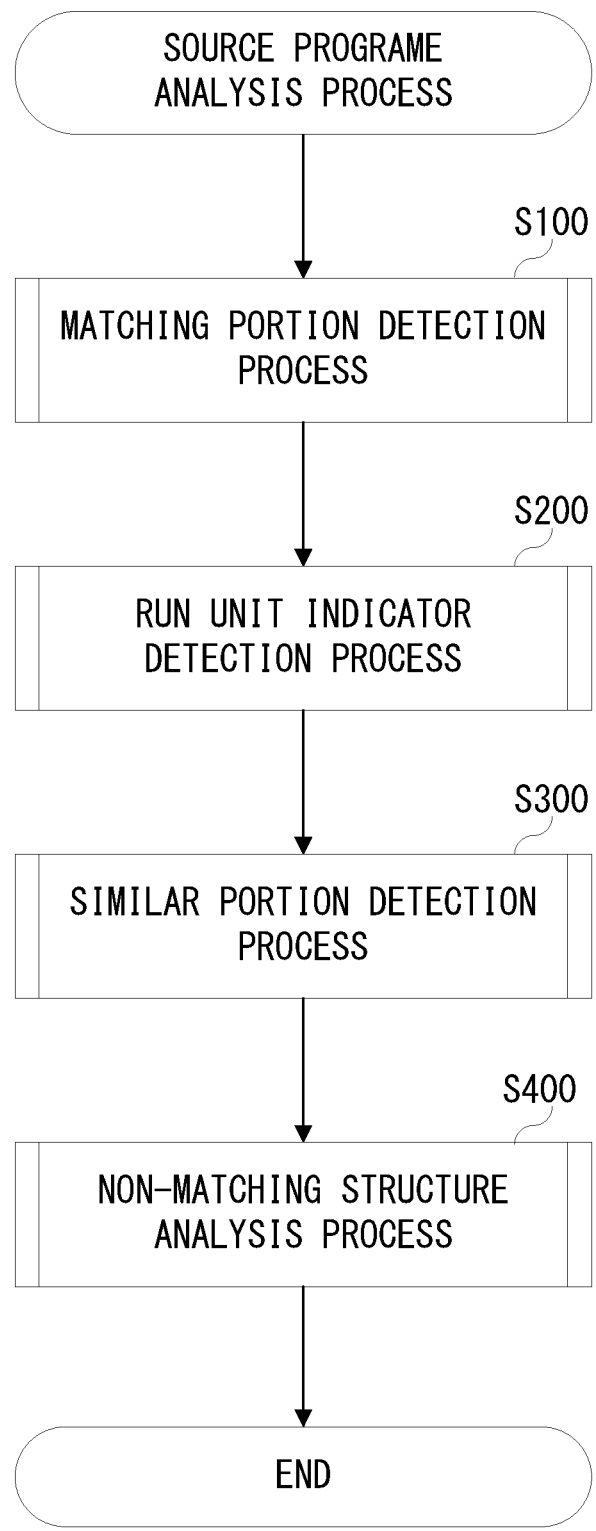
FIG. 10 is a flowchart showing a source program analysis process.

When the user inputs an instruction to start the analysis of the source program 1 to the source program analysis system 100 through the operation unit 130, the source program analysis system 100 starts the source program analysis process shown in FIG. 10.

First, the controller 110 starts a matching portion detection process (Step S100).

Figure 11:
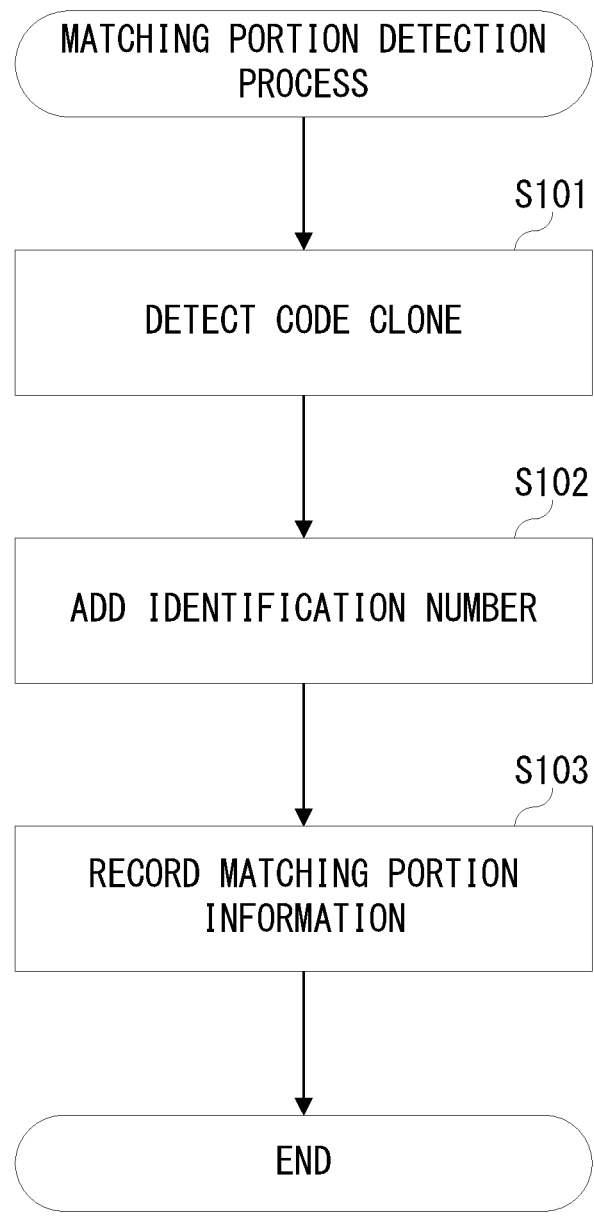
FIG. 11 is a flowchart showing a matching portion detection process.

The matching portion detection process (Step S100) will be described in details with reference to FIG. 11. The controller 110 detects the matching portions contained in the source program 1, as shown in FIG. 11 (Step S101). More specifically, the controller 110 analyzes the program description of the source program 1 shown in FIG. 9, and detects that the source code from the 05th line to the 06th line matches the source code from the 11th line to the 12th line. Accordingly, the controller 110 detects the source code from the 05th line to the 06th line and the source code from the 11th line to the 12th line, as matching portions. Likewise, the controller 110 detects the source codes from the 08th line to the 10th line, and from the 14th line to the 16th line, as matching portions.

Then the controller 110 assigns an identification number to each of the matching portions detected at Step S101 (Step S102). To be more detailed, the controller 110 gives the code clone ID and the group ID as identification number, to each of the source codes from the 05th line to the 06th line, from the 08th line to the 10th line, from the 11th line to the 12th line, and from the 14th line to the 16th line. At this point, the controller 110 assigns the code clone IDs so as to avoid duplication among the detected matching portions. Regarding the group ID, the controller 110 assigns the same group ID to the matching portions the respective contents of which match each other, while assigning different group IDs to the code clones that do not match each other. Thus, the controller 110 assigns the code clone ID "1" and the group ID "1" to the source code from the 05th line to the 06th line, and the code clone ID "2" and the group ID "2" to the source code from the 08th source code 10th line. Here, the source code from the 11th line to the 12th line has the same content as the source code from the 05th line to the 06th line. Accordingly, the controller 110 assigns the code clone ID "3" and the group ID "1", which is the same as the group ID of the source code from the 05th line to the 06th line, to the source code from the 11th line to the 12th line. Likewise, the controller 110 assigns the code clone ID "4" and the group ID "2" to the source code from the 14th line to the 16th line.

The controller 110 then records the matching portion information in the matching portion information DB 21, with respect to each of the code clones detected at Step S101 (Step S103). The matching portion information is composed of the code clone ID, the group ID, the file name, the initial line number, and the end line number of each of the matching portions. More specifically, the source code from the 05th line to the 06th line is given the code clone ID "1" and the group ID "1", given the file name of "src.c" according to the file name of the source program 1, the initial line number of "05", and the end line number of "06". The controller 110 combines these items and records in the matching portion information DB 21. The controller 110 performs the same process with respect to the source codes from the 08th line to the 10th line, from the 11th line to the 12th line, and from the 14th line to the 16th line.

Through the mentioned process, the information shown in FIG. 12 is recorded in the matching portion information DB 21. The controller 110 serves as the matching portion detector 11 in the mentioned process.

Figure 13:
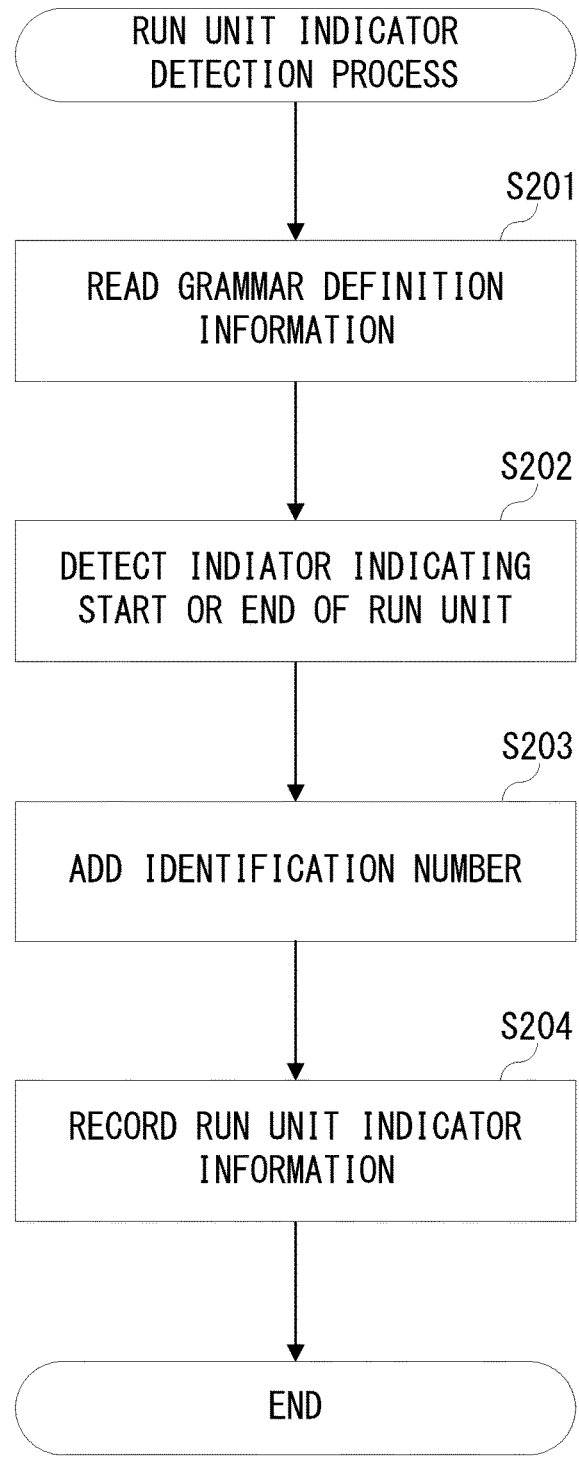
FIG. 13 is a flowchart showing a run unit indicator detection process.

Upon completing the mentioned process, the controller 110 finishes the matching portion detection process (Step S100), and proceeds to a run unit indicator detection process (Step S200) according to the flowchart shown in FIG. 10. Hereunder, the run unit indicator detection process performed by the controller 110 will be described with reference to FIG. 13.

At the start of the run unit indicator detection process, the controller 110 reads out the grammar definition information corresponding to the description language of the source program 1, from the grammar definition information DB 22 (Step S201). Since the source program 1 is described in C language as shown in FIG. 9, the controller 110 reads out the grammar definition information corresponding to C language from the grammar definition information DB 22 shown in FIG. 14. The grammar definition information DB 22 contains, as shown in FIG. 14, the grammar definition information corresponding to C language. In the grammar definition information, a symbol "{" is defined as indicator of the start of a function, and a symbol "}" is defined as indicator of the end of the function. Thus, the controller 110 handles "{" as symbol indicating the start of the function and "}" as symbol indicating the end of the function in the source program 1, in accordance with the grammar definition information.

Then the controller 110 detects the indicator indicating the start or end of the run unit, in the source program 1 (Step S202). More specifically, the controller 110 analyzes the source program 1 shown in FIG. 9, and detects the symbol "{" in the 01st line and the symbol "}" in the 18th line as indicators respectively indicating the start and the end of the run unit.

The controller 110 then assigns the identification number to each of the indicators indicating the start and the end of the run unit, detected at Step S201 (Step S203). More specifically, the controller 110 assigns the run unit indicator IDs "1" and "2" to the symbol "{" in the 01st line and the symbol "}" in the 18th line in the source program 1, respectively. At this point, the controller 110 assigns the run unit indicator IDs so as to avoid duplication.

The controller 110 then records the run unit indicator information in the run unit indicator information DB 23, with respect to each information indicating the start or end of the run unit detected at Step S201 (Step S204). The run unit indicator information is, as described above, composed of the run unit indicator ID, the run unit type, the start/end property, the file name, the initial line number, and the end line number. More specifically, the symbol "{" in the 01st line of the source program 1 is given the run unit indicator ID "1", and possesses the property representing the "start" of the "function", the file name of "src.c" according to the file name of the source program 1, the initial line number of "01", and the end line number of "01". The controller 110 combines such information and records in the run unit indicator information DB 23. The controller 110 performs the same process with respect to the symbol "}" in the 18th line in the source program 1.

Through the mentioned process, the information shown in FIG. 15 is recorded in the run unit indicator information DB 23. In the mentioned process, the controller 110 serves as the run unit indicator detector 12.

Upon completing the mentioned process, the controller 110 finishes the run unit indicator detection process (Step S200). The controller 110 then proceeds to a similar portion detection process (Step S300), according to the flowchart shown in FIG. 10. Hereunder, the similar portion detection process performed by the controller 110 will be described with reference to FIG. 16.

Figure 17:
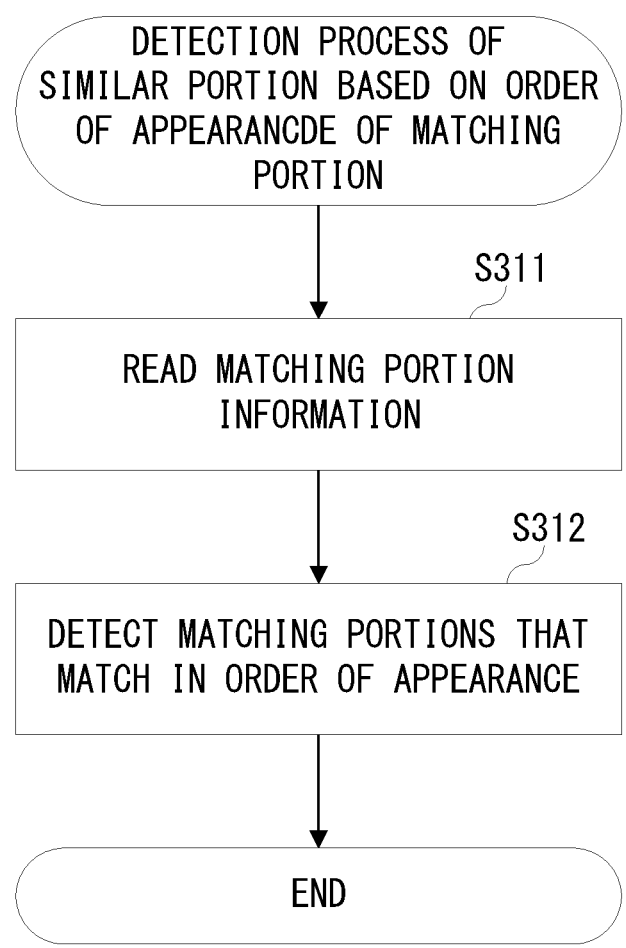
FIG. 17 is a flowchart showing a similar portion detection process based on order of appearance of the matching portion.

At the start of the similar portion detection process, the controller 110 detects the similar portion on the basis of the order of appearance of the matching portions (Step S310), and detects the similar portion of the first pattern from the matching portion information DB 21. The similar portions detected in the order of appearance of the matching portions each contain a plurality of code clones of type 1 or type 2 and one or more parts interposed between the code clones, and hence correspond to the similar portion of the first pattern. Hereunder, the similar portion detection process based on the order of appearance of the matching portions will be described with reference to FIG. 17.

At the start of the similar portion detection process based on the order of appearance of the matching portions, the controller 110 reads out the matching portion information from the matching portion information DB 21 (Step S311). More specifically, the controller 110 reads out the matching portion information corresponding to the code clone IDs 1 to 4 from the matching portion information DB 21.

Then the controller 110 detects, in the matching portion information read out as above, such portions where a plurality of matching portions are aligned in the same order of appearance without another matching portion being interposed (Step S312). More specifically, the controller 110 detects that, on the basis of the matching portion information corresponding to the code clone IDs 1 to 4 read out as above, the portion containing the matching portions of the code clone IDs 1 and 2 and the portion containing the matching portions of the code clone IDs 3 and 4 both possess the structure in which the code clones of the group IDs 1 and 2 sequentially appear. The controller 110 detects the section from the matching portion of the code clone ID 1 to the matching portion of the code clone ID 2 as similar portion 1. Likewise, the controller 110 detects the section from the matching portion of the code clone ID 3 to the matching portion of the code clone ID 4 as similar portion 2. Since the similar portion 1 starts from the initial position of the matching portion of the code clone ID 1, the initial line number of the similar portion 1 is 05th. Since the similar portion 1 ends at the end position of the code clone of the code clone ID 2, the end line number of the similar portion 1 is 10th. Further, the code clones on the respective ends of the similar portion 1 possess the group IDs "1" and "2", and hence the similar portion 1 possesses "1, 2" as matching portion list. Since the similar portion 2 starts from the initial position of the matching portion of the code clone ID 3, the initial line number of the similar portion 2 is 11th. Since the similar portion 2 ends at the end position of the code clone of the code clone ID 4, the end line number of the similar portion 2 is 16th. Further, the code clones on the respective ends of the similar portion 2 possess the group IDs "1" and "2", and hence the similar portion 2 possesses "1, 2" as matching portion list.

Figure 18:
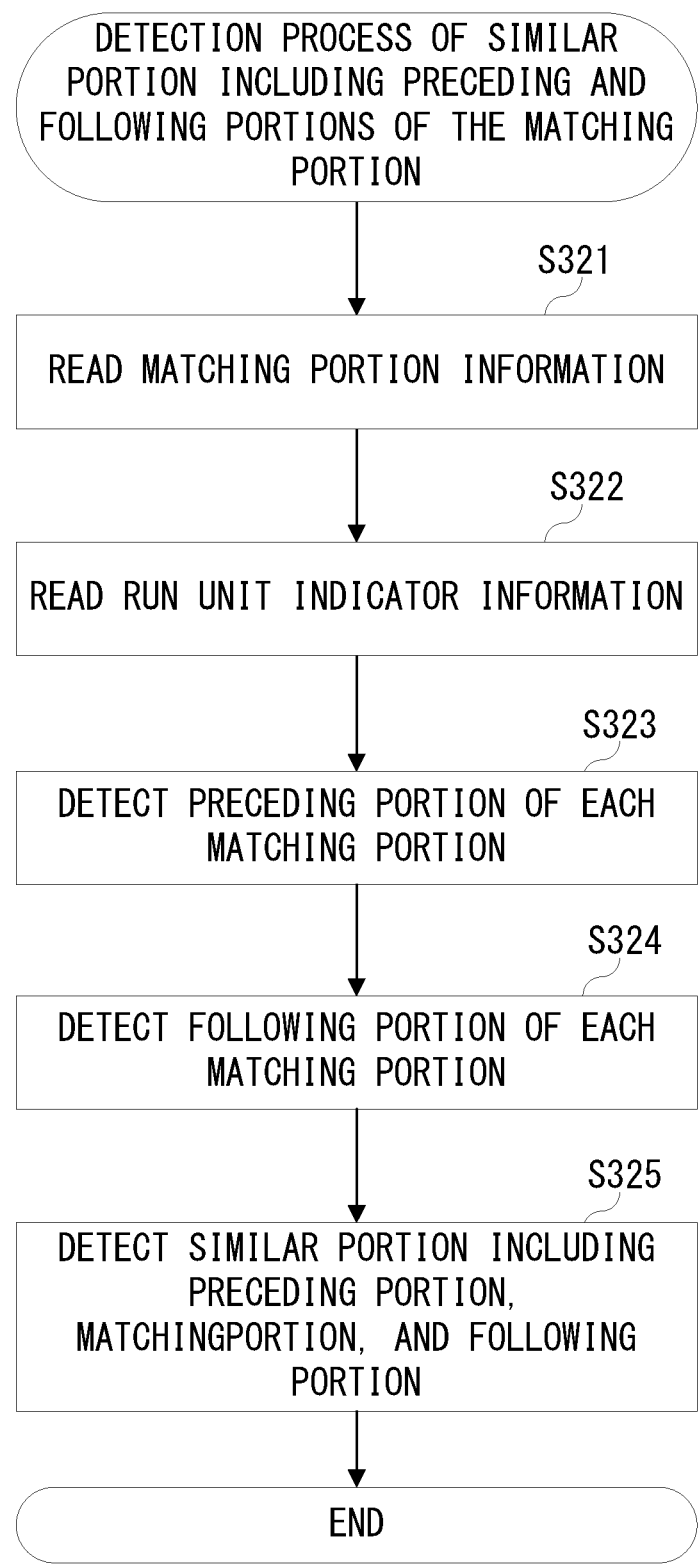
FIG. 18 is a flowchart showing a detection process of the similar portion containing a preceding portion and a following portion of the matching portion.

Upon completing the mentioned process, the controller 110 finishes the similar portion detection process based on the order of appearance of the matching portions (Step S310). The controller 110 then proceeds to a detection process of the similar portion containing the preceding and following portions of the matching portion, according to the flowchart shown in FIG. 16 (Step S320). Hereunder, the detection process of the similar portion containing the preceding and following portions of the matching portion will be described, with reference to FIG. 18.

At the start of the detection process of the similar portion containing the preceding and following portions of the matching portion, the controller 110 reads out the matching portion information from the matching portion information DB 21 (Step S321). More specifically, the controller 110 reads out the matching portion information corresponding to the code clone IDs 1 to 4 from the matching portion information DB 21.

Then the controller 110 reads out the run unit indicator information from the run unit indicator information DB 21 (Step S322). More specifically, the controller 110 reads out the run unit indicator information corresponding to the run unit indicator IDs 1 to 2, from the matching portion information DB 21.

The controller 110 then detects the preceding portion of the matching portion that has been read out (Step S323). The preceding portion of the matching portion refers to a portion between a predetermined delimiter in the source code and the initial line of the matching portion. The predetermined delimiter refers to (1) the end line of another matching portion immediately anterior to the matching portion, or (2) the line that contains the code indicating the start or end of the run unit immediately anterior to the matching portion. The controller 110 extracts as preceding portion the portion between (1) or (2) whichever appears later and the initial line of the matching portion.

More specifically, the controller 110 detects, with respect to the matching portion of the code clone ID 1 read out from the matching portion information DB 21, that (1) no other matching portion is present in the immediately anterior position, and (2) the code indicating the start or end of the immediately anterior run unit is "{" in the 01st line. Since no other matching portion has been detected according to (1), the controller 110 identifies the preceding portion by the detection of (2). As result, the controller 110 detects the portion from the 02nd line (next line of the line containing the symbol "{") to the 04th line (line anterior to the initial line of the matching portion initial line), as preceding portion of the code clone having the code clone ID 1.

Likewise, the controller 110 detects the preceding portion also with respect to the matching portion of the code clone ID 2. In this case, the controller 110 detects that (1) the matching portion of the code clone ID 1 is located immediately anterior to the matching portion of the code clone ID 2, and the end line of the former matching portion is the 06th line, and (2) the code indicating the start or end of the run unit immediately anterior to the matching portion of the code clone ID 2 is "{" in the 01st line. Since the 06th line detected according to (1) is on the posterior side, the controller 110 extracts the preceding portion according to the detection of (1). Therefore, the controller 110 detects the portion from the 07th line (next line of the end line of the immediately anterior code clone) to the 07th line (line anterior to the initial line of the code clone), as preceding portion of the matching portion having the code clone ID 2.

Then the controller 110 detects the preceding portion also with respect to the matching portion of the code clone ID 3. In this case, the controller 110 detects that (1) another matching portion immediately anterior to the matching portion of the code clone ID 3 is the matching portion of the code clone ID 2, and the end line of the latter matching portion is the 10th line, and (2) the code indicating the start or end of the run unit immediately anterior to the matching portion of the code clone ID 2 is "{" in the 01st line. Since the 10th line detected according to (1) is on the posterior side, the controller 110 detects the preceding portion according to the detection of (1). Here, the controller 110 detects that the predetermined delimiter detected according to (1) is the line anterior to the initial line (11th line) of the matching portion of the code clone ID 3. Since no source code is present between the predetermined delimiter and the initial line of the matching portion of the code clone ID 3, the controller 110 detects that the matching portion of the code clone ID 3 is not accompanied with a preceding portion.

The controller 110 also detects the preceding portion with respect to the matching portion of the code clone ID 4. Through a similar process, the controller 110 detects the portion from the 13th line (next line of the end line of the immediately anterior matching portion) to the 13th line (line anterior to the initial line of the matching portion), as preceding portion of the matching portion of the code clone ID 4.

Then the controller 110 detects the following portion of the matching portions read out as above (Step S324). The following portion of the matching portion refers to a portion between the end line of the matching portion and a predetermined delimiter in the source code. Here, the predetermined delimiter refers to (1) the initial line of another matching portion immediately posterior to the matching portion, or (2) the line that contains the code indicating the start or end of the run unit immediately posterior to the matching portion, and the controller 110 detects as following portion the portion between the end line of the matching portion and (1) or (2) whichever appears first.

More specifically, the controller 110 detects, with respect to the matching portion of the code clone ID 1 read out from the matching portion information DB 21, that (1) the matching portion of the code clone ID 2 is located immediately posterior to the matching portion of the code clone ID 1, and the initial line of the former matching portion is the 08th line, and (2) the code indicating the start or end of the run unit immediately posterior to the matching portion of the code clone ID 1 is "}" in the 18th line. Since the 08th line detected according to (1) is on the anterior side, the controller 110 extracts the following portion according to the detection of (1). Therefore, the controller 110 detects the portion from the 07th line (next line of the end line of the matching portion) to the 07th line (line anterior to the initial line of immediately posterior another matching portion), as following portion of the matching portion having the code clone ID 1.

The controller 110 then detects the following portion with respect to the matching portions of the code clone IDs 2 to 4, through similar processes. The controller 110 detects that the matching portion of the code clone ID 2 is not accompanied with a following portion. Further, the controller 110 detects the portion from the 13th line to the 13th line and the portion from the 17th line to the 17th line, as following portion of the matching portion of the code clone ID 3 and the following portion of the matching portion of the code clone ID 4, respectively.

Then the controller 110 detects as similar portion, on the basis of the matching portions read out as above, the portion containing the detected preceding portion, the matching portion, and the detected following portion (Step S325). More specifically, the controller 110 combines the preceding portion (02nd line to the 04th line), the matching portion (05th line to the 06th line), and the following portion (07th line to the 07th line) according to the matching portion of the code clone ID 1, and detects the combined portion as similar portion 3. The initial line number of the similar portion 3 is the 02nd, and the end line number is the 07th. The similar portion 3 is detected on the basis of the matching portion having the group ID "1", and hence possesses "1" as matching portion list. Likewise, controller 110 detects similar portions 4 to 6 on the basis of the code clone IDs 2 to 4. However, since the matching portion of the code clone ID 2 is not accompanied with the following portion and the matching portion of the code clone ID 3 is not accompanied with the preceding portion, the end line and the initial line of the matching portions themselves correspond to the end line and the initial line of the similar portions. Thus, the controller 110 detects the similar portion 4 (07th line to 10th line, matching portion list is "2"), the similar portion 5 (11th line to 13th line, matching portion list is "1"), and the similar portion 6 (13th line to 17th line, matching portion list is "2").

Figure 16:
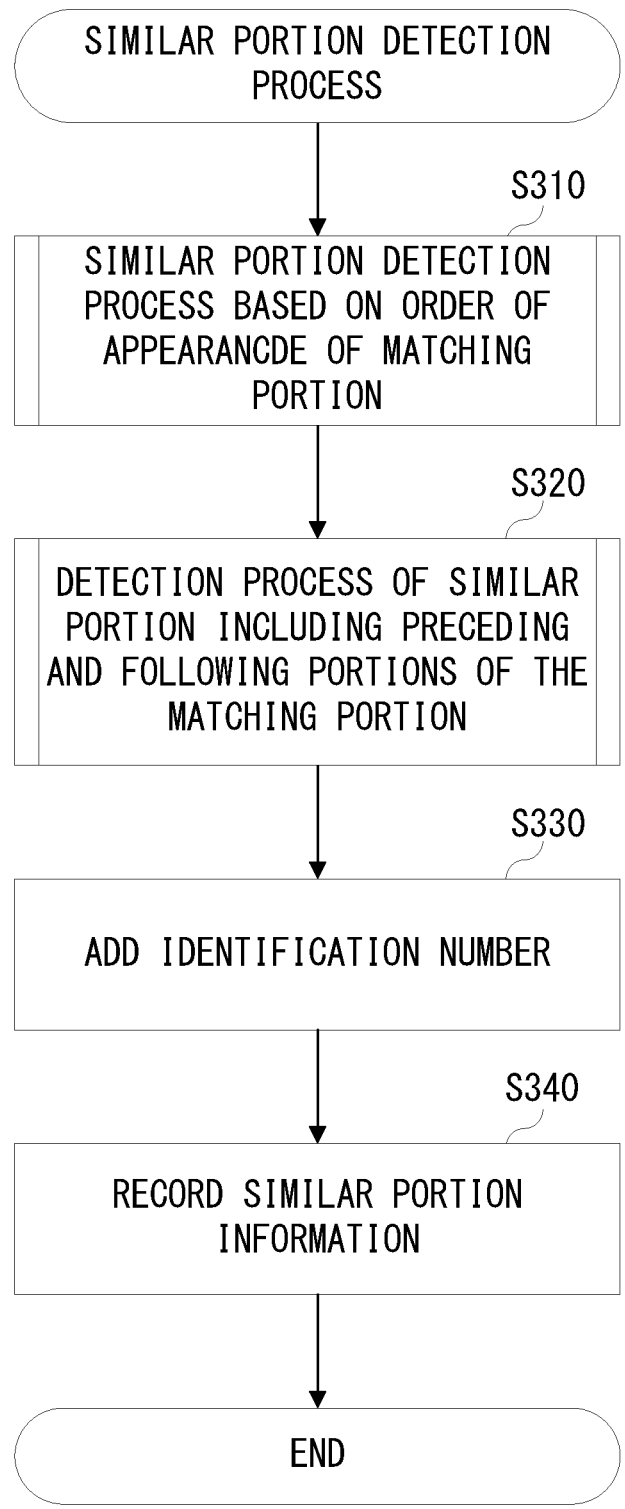
FIG. 16 is a flowchart showing a similar portion detection process.

Then the controller 110 assigns the identification number to the similar portions detected at Step S310 and Step S320, as shown in FIG. 16 (Step S330). More specifically, the controller 110 assigns the similar portion ID and the similar portion group ID to the similar portions (similar portions 1 to 6). At this point, the controller 110 assigns the similar portion ID so as to avoid duplication among the detected similar portions. In this exemplary embodiment, the controller 110 assigns the similar portion ID "1" to the similar portion 1, and then sequentially assigns the similar portion ID up to the similar portion 6. Regarding the similar portion group ID, the controller 110 assigns the same similar portion group ID to the similar portions detected at the same Step (Step S310 or Step S320), on the basis of the code clones having the same group ID. All of the similar portions that the controller 110 has detected at step S310 are of the first pattern, in other words all detected in the same pattern. Likewise, all of the similar portions that the controller 110 has detected at step S320 are of the second pattern, in other words in the same pattern. More specifically, since the similar portions 1 and 2 are detected on the basis of the code clones having the same group ID (1 and 2) at Step S310, the controller 110 assigns the same similar portion group ID "1" to the similar portions 1 and 2. Likewise, since the similar portions 3 and 5 are detected on the basis of the code clones having the same group ID "1" at Step S320, the controller 110 assigns the same similar portion group ID "2" to the similar portions 3 and 5. Thus the controller 110 assigns the same similar portion group ID "3" to the similar portions 4 and 6.

The controller 110 then generates the similar portion information according to each of the similar portions, and records the information in the similar portion information DB 24, as shown in FIG. 16 (Step S340). More specifically, the controller 110 records, on the basis of the similar portion 1 detected at Step S310, the similar portion information (similar portion ID "1", similar portion group ID "1", file name "src.c", initial line number "05", end line number "10", and matching portion list "1, 2"). Likewise, the controller 110 also records the similar portion information in the similar portion information DB 24 with respect to the similar portions 2 to 6.

Through the mentioned process, the information shown in FIG. 19 is recorded in the similar portion information DB 24. In the mentioned process, the controller 110 serves as the similar portion detector 13.

Upon completing the mentioned process, the controller 110 finishes the similar portion detection process (Step S300) shown in FIG. 10. Then the controller 110 proceeds to a non-matching structure analysis process (Step S400) according to the flowchart shown in FIG. 10. Hereunder, the non-matching structure analysis process will be described with reference to FIG. 20.

Figure 20:
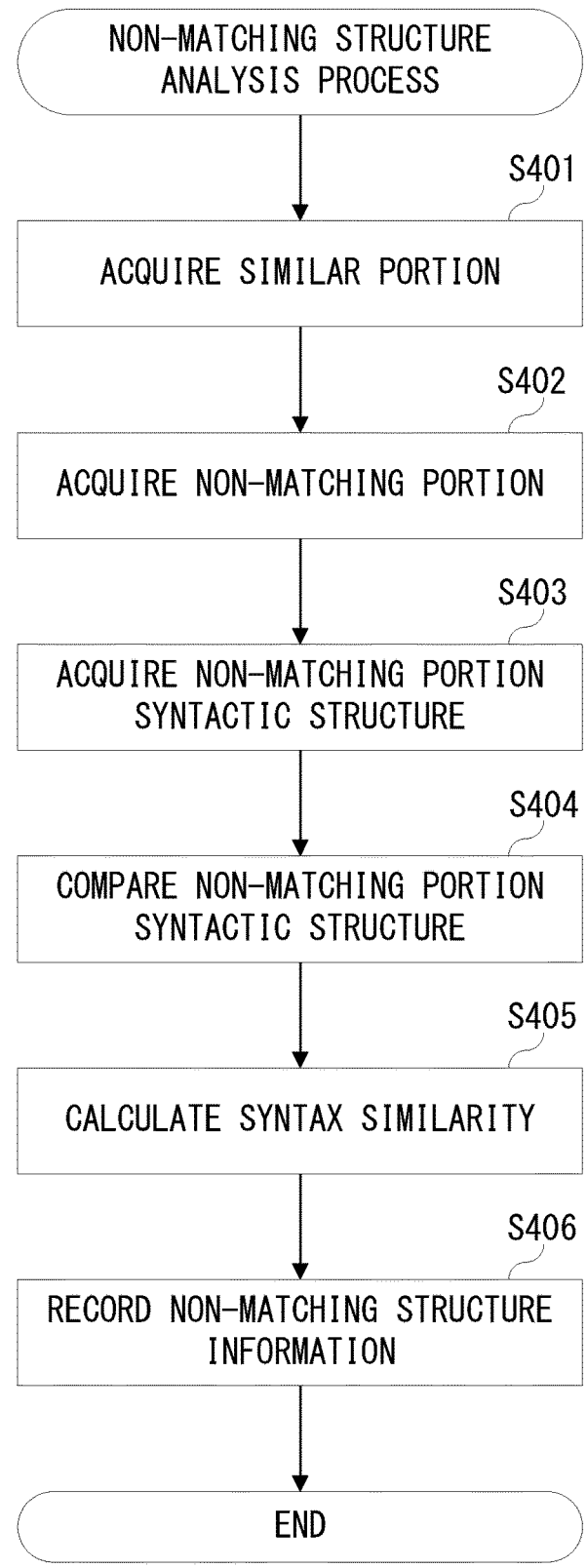
FIG. 20 is a flowchart showing a non-matching portion analysis process.

At the start of the non-matching structure analysis process shown in FIG. 20, the controller 110 acquires the similar portions having the same similar portion group ID out of the similar portions stored in the similar portion information DB 24 (Step S401). Hereunder, the similar portions having the similar portion group ID of "1" (similar portions 1 and 2) will be referred to as examples.

The controller 110 identifies the non-matching portion contained in the similar portions of the same similar portion group ID, and reads out the corresponding program description from the source program 1 (Step S402). More specifically, the controller 110 reads out the similar portion information regarding the similar portion 1 from the similar portion information DB 24, and reads out that the initial line number is the 05th and the end line number is the 10th. The controller 110 extracts, since the matching portion list of the similar portion 1 is "1, 2", the source code from the 05th line to the 10th line in the source program 1, except for the portion corresponding to the code clone of the code clone ID 1 (05th line to 06th line), and the portion corresponding to the code clone of the code clone ID 2 (08th line to 10th line). Thus, the controller 110 identifies the 07th line of the source program 1 as non-matching portion in the similar portion 1, and extracts the 07th line. Likewise, the controller 110 identifies the 13th line of the source program 1 as non-matching portion in the similar portion 2, and extracts the 13th line.

Figure 21A:
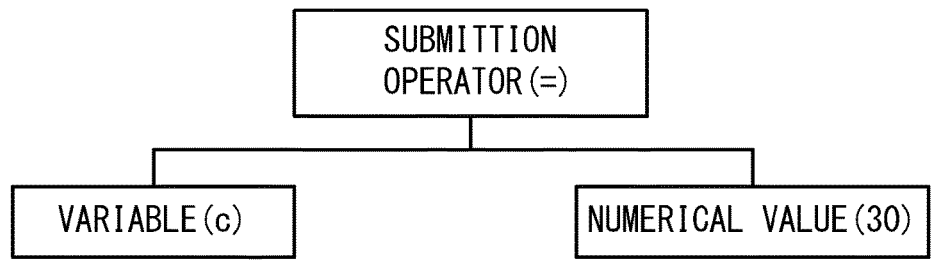
FIG. 21A is a diagram showing an example of a syntactic structure obtained through the non-matching portion analysis process.
Figure 21B:
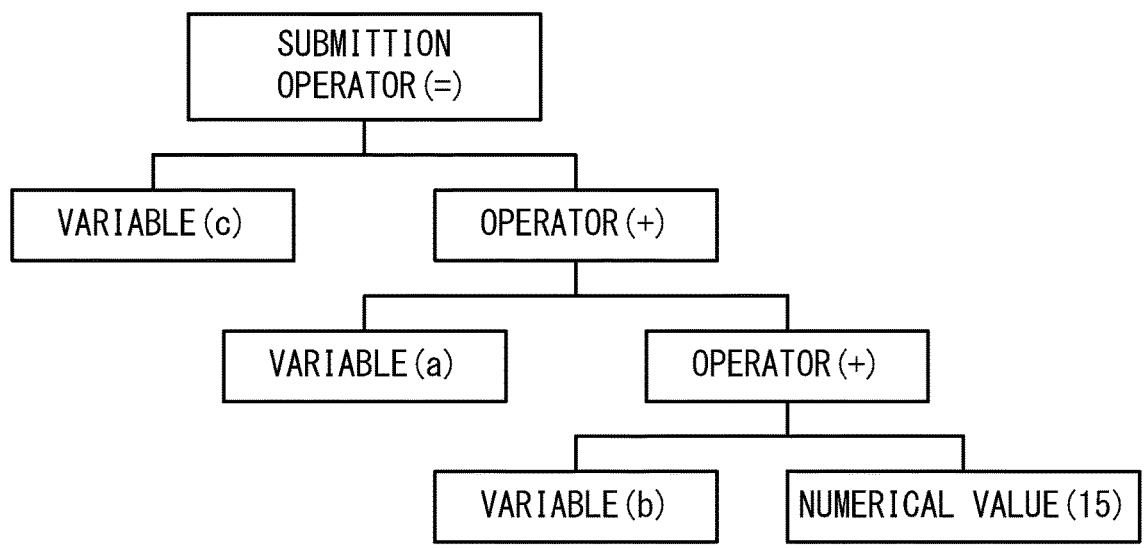
FIG. 21B is a diagram showing another example of the syntactic structure obtained through the non-matching portion analysis process.

Then the controller 110 analyzes the non-matching portion identified at Step S402 and acquires the syntactic structure (Step S403). More specifically, the controller 110 reads out the program description of the non-matching portion (07th line) in the similar portion 1 from the source program 1, and analyzes the syntax on the basis of the grammar definition information stored in the grammar definition information DB 22. In this exemplary embodiment, the LR method is employed for the syntactic analysis of the 07th line of the source program 1. The 07th line of the source program 1 contains an equation in which a variable (c), a substitution operator (=), and a numerical value (30) are sequentially connected. The controller 110 analyzes the equation on the basis of the syntax tree, to thereby acquire the syntactic structure shown in FIG. 21A. Likewise, the controller 110 syntactically analyzes the 13th line of the source program 1, with respect to the non-matching portion in the similar portion 2 (13th line). The 13th line of the source program 1 contains an equation in which a variable (c), a substitution operator (=), a variable (a), an operator (+), a variable (b), an operator (+), and a variable (c) are sequentially connected. The controller 110 analyzes the equation on the basis of the syntax tree, to thereby acquire the syntactic structure shown in FIG. 21B.

Figure 21C:
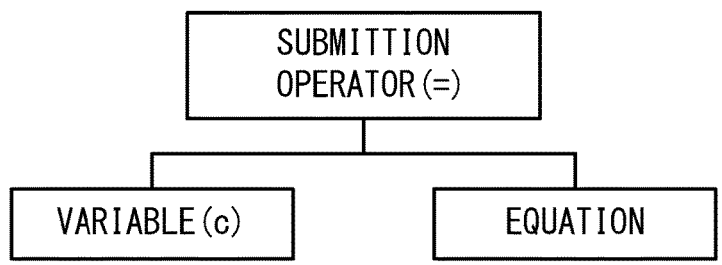
FIG. 21C is a diagram showing still another example of the syntactic structure obtained through the non-matching portion analysis process.

The controller 110 then compares the syntactic structure acquired at Step S403, between the similar portions having the same similar portion group ID (Step S404). More specifically, the controller 110 compares the syntactic structure (FIG. 21A, FIG. 21B) between the respective non-matching portions of the similar portions 1 and 2 having the same similar portion ID, and extracts the syntactic structure that is common to the both non-matching portions (hereinafter, non-matching portion common syntactic structure). The controller 110 makes the comparison by sequentially tracking the syntactic structures of the respective non-matching portions from the top of the syntax tree. The controller 110 recognizes that, although the substitution operator (=) and the left-hand side (variable (c)) are common to the both structures, the right-hand sides have different structures, and that the right-hand sides have a common nature as "equation". As result, the controller 110 extracts, as shown in FIG. 21C, the syntactic structure in which the variable (c), the substitution operator (=), and the equation are sequentially connected, as non-matching portion common syntactic structure.

The controller 110 the compares between the syntactic structure of the non-matching portions in the respective similar portions and the non-matching portion common syntactic structure extracted at Step S404, and calculates syntactic similarity (Step S405). More specifically, the controller 110 compares between the syntactic structure of the respective non-matching portions in the similar portions 1 and 2 and the non-matching portion common syntactic structure, and calculates the syntactic similarity indicating the ratio of the matching nodes. The controller 110 compares between the syntactic structure of the non-matching portion in the similar portion 1 shown in FIG. 21A and the non-matching portion common syntactic structure shown in FIG. 21C. As result, the controller 110 detects that, out of the three nodes contained in the syntactic structure of the non-matching portion, the node of the substitution operator (=) and the node of the variable (c) match those of the non-matching portion common syntactic structure, and the node of the numerical value (30) also matches the node ("equation") of the non-matching portion common syntactic structure. The three nodes match out of the three nodes contained in the syntactic structure of the non-matching portion, and therefore the controller 110 calculates the syntactic similarity of the similar portion 1 as 3/3=100%. Likewise, the controller 110 compares between the syntactic structure of the non-matching portion in the similar portion 2 and the non-matching portion common syntactic structure. As result, three nodes match out of the seven nodes contained in the syntactic structure of the non-matching portion, and therefore the controller 110 calculates the syntactic similarity of the similar portion 1 as 3/7=42.8%.

Figure 22:
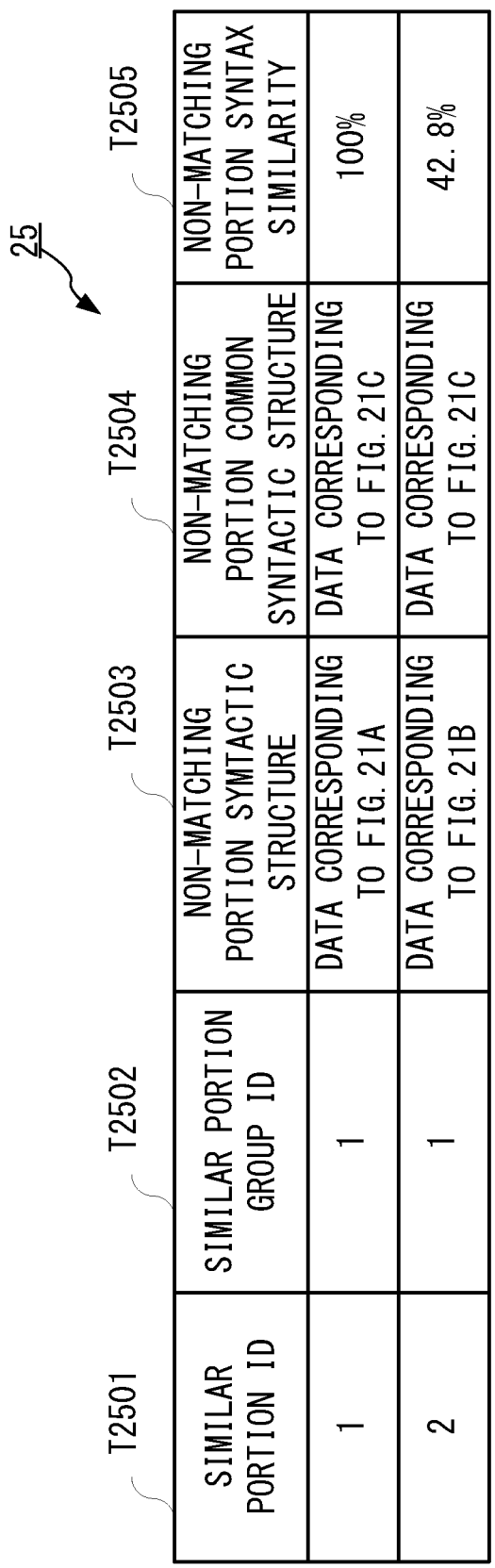
FIG. 22 is a table showing the content of the non-matching structure information DB after the non-matching portion analysis process.

Then the controller 110 generates the non-matching structure information and records the information in the non-matching structure information DB 25 (Step S406). The controller 110 extracts the similar portion ID, the similar portion group ID, the syntactic structure of the non-matching portion, the non-matching portion common syntactic structure, and the syntactic similarity from the information detected through the foregoing process from Step S401 to Step S405, and records the mentioned data in the non-matching structure information DB 25, as non-matching structure information. The controller 110 records the syntactic structure of the non-matching portion and the non-matching portion common syntactic structure in the form of binary data indicating the layered structure of the syntax. The controller 110 generates, with respect to the similar portion 1, the non-matching structure information composed of the similar portion ID "1", the similar portion group ID "1", the information of the syntactic structure of the non-matching portion (binary data representing the layered structure of the syntax shown in FIG. 21A), the information of the non-matching portion common syntactic structure (binary data representing the layered structure of the syntax shown in FIG. 21C), and the syntactic similarity "100%", and records such non-matching structure information in the non-matching structure information DB 25. With respect to the similar portion 2 also, the controller 110 generates the non-matching structure information and records such information in the non-matching structure information DB 25. Thus, the non-matching structure information shown in FIG. 22 is recorded in the non-matching structure information DB 25.

The controller 110 also performs the foregoing process from Step S401 to Step S406 with respect to the similar portions 3 to 6. As result, the non-matching structure information corresponding to the extracted six similar portions is recorded in the non-matching structure information DB 25.

Through the mentioned process, the non-matching structure information is recorded in the non-matching structure information DB 25. In the mentioned process, the controller 110 serves as the similar portion detector 13.

Upon completing the process of Step S406, the controller 110 finishes the non-matching structure analysis process shown in FIG. 20. With the completion of the non-matching structure analysis process, the controller 110 finishes the source program analysis process shown in FIG. 10.

As described above, the controller 110 records the code clones of type 3 in the inputted source program 1 in the non-matching structure information DB 25, as similar portions. Accordingly, the user can recognize where in the source program 1 the code clones of type 3 are located, by viewing the data in the non-matching structure information DB 25. In addition, the controller 110 records the syntactic similarity of each of the similar portions in the non-matching structure information DB 25. The syntactic similarity is a numerical expression of the structural and syntactic similarity, which is essential from the viewpoint of the program maintenance. Therefore, the user can estimate the work amount and time required for modification of the program, by looking up the syntactic similarity.

As described thus far, the present disclosure provides the source program analysis system 100 capable of detecting the code clones of type 3 from the source program 1, and outputting effective information for calculating the modification cost of the program. Looking up the syntactic similarity obtained through the foregoing process enables estimation of the work amount and time required, for example, for procedures proposed in the event of system migration, thereby enabling evaluation of the procedures for the migration. In addition, in a refactoring process of a source code of an existing system, the points to be worked can be identified and the work amount can be estimated.

Although the exemplary embodiment of the present disclosure has been described as above, the present disclosure is in no way limited to the exemplary embodiment.

In this exemplary embodiment, the controller 110 employs CC finder X, which is the software disclosed in Non Patent Literature 2, to detect the matching portions in the matching portion detection process, other methods may be employed. Any desired software may be employed for the matching portion detection process, provided that the software allows the code clone of type 1 or type 2 to be detected from the source program.

The similar portion detector 13 detects as similar portions, at Step S311, the sections in which a plurality of matching portions are aligned in the same order of appearance without another matching portion being interposed, in the source program. However, the similar portion detector 13 may detect sections in which a plurality of matching portions are aligned in the same order of appearance with another matching portion interposed therebetween, as similar portions. When such detection is adopted in the exemplary embodiment, the section from the matching portion of the code clone ID 1 to the matching portion of the code clone ID 4 is detected as similar portion of the similar portion group ID 1.

In this exemplary embodiment, the source program analysis system 100 analyzes the source program 1 with respect to each line. However, the unit to be analyzed is not limited to the line, and the matching portions may be detected, for example, with respect to each section delimited by another code than the CR+LF code. For example, the analysis may be performed with respect to each word or character.

In this exemplary embodiment, the similar portion detector 13 detects the similar portions of the first pattern and the second pattern. Alternatively, the similar portion detector 13 may only detect the similar portions of the first pattern, or the similar portions of the second pattern. Further, the similar portions may be detected on the basis of different schemes.

In this exemplary embodiment, the matching portion detector 11 records the matching portion information in the matching portion information DB 21, and the similar portion detector 13 reads out the matching portion information from the matching portion information DB 21. However, it is not always necessary to once record the matching portion information in the database, and the matching portion detector 11 may directly provide the matching portion information to the similar portion detector 13. In addition, although the matching portion information DB 21 is located in the storage unit 120 in this exemplary embodiment, the matching portion information DB 21 may be stored in another location without limitation to the storage unit 120, for example in the RAM of the controller 110, or in another apparatus accessible through a network. This also applies to other databases, namely the grammar definition information DB 22, the run unit indicator information DB 23, the similar portion information DB 24, and the non-matching structure information DB 25. The location of the databases may be determined as desired and, further, it is not necessary to prepare the database, provided that the information can be transmitted to a functional unit or the user that needs the information. The format of the database may be selected as desired, for example a general-purpose file or a data set having a database structure.

A distinctive feature of the present disclosure is the detection of the matching portions, the respective contents of which match each other, from the source program, the detection of the similar portions contained in the source program, on the basis of the matching portions that have been detected, and the outputting of the index indicating the similarity between the non-matching portions in the similar portions that have been detected. The present disclosure is not only applicable to a source program, but may also be utilized as follows. With the source program analysis system according to the present disclosure, for example, similar portions and the similarity therebetween can be acquired among submitted theses of a given theme. Such a use facilitates finding out whether any part of the text has been copied among the presenters.

The source program analysis system according to the exemplary embodiment of the present disclosure can be set up using an ordinary computer system, instead of a customized system. For example, the program for executing the foregoing operation may be recorded on a non-transitory computer-readable recording medium such as a flexible disk, a compact disk-read only memory (CD-ROM), a digital versatile disk (DVD), and a magnet optical disk (MO), and distributed for installation in a computer system, so as to constitute the source program analysis system. Further, the program may be stored in a disk device of a server apparatus available on the Internet, and downloaded to a computer by being superposed on the carrier wave.

Figure 23:
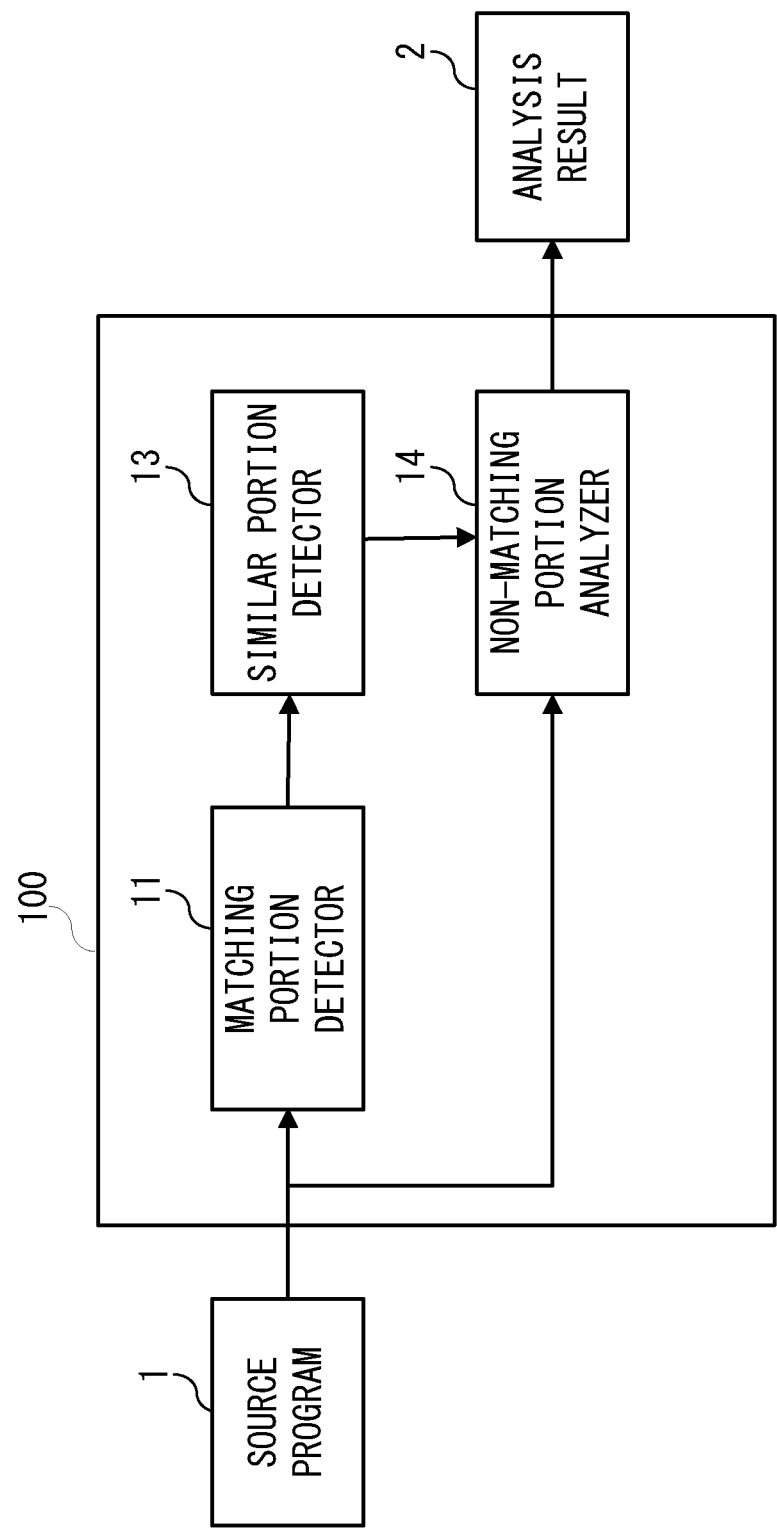
FIG. 23 is a functional block diagram of the source program analysis system according to the exemplary embodiment of the present disclosure.

The source program analysis system 100 according to the exemplary embodiment of the present disclosure may be constituted of the matching portion detector 11, the similar portion detector 13, and the non-matching portion analyzer 14 as shown in FIG. 23. The matching portion detector 11 detects the matching portions the respective contents of which match each other, from the source program 1. The similar portion detector 13 detects, on the basis of the matching portions detected by the matching portion detector 11, the similar portions each containing a part that matches a part of another similar portion and another part that does not match, from the source program 1. The non-matching portion analyzer 14 analyzes the syntax of the non-matching portion in the similar portions detected by the similar portion detector 13, and outputs the index indicating the degree of similarity to another similar portion, as the analysis result 2. The user can recognize, in view of the analysis result 2 generated by the non-matching portion analyzer 14, the position and the number of code clones in which a sentence has been inserted, deleted, or modified, in the source program 1, and the syntactic similarity among the code clones. Accordingly, the user can acquire effective information for calculating the modification cost of the source program 1. Thus, with the foregoing configuration an objective of the present disclosure can be accomplished, and the advantageous effects of the present disclosure can be attained.

The foregoing describes some exemplary embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The whole or part of the exemplary embodiments disclosed above can be described as the following supplementary notes, without limitation thereto.

[Supplementary Note 1] A source program analysis system including:

a matching portions detector which detects matching portions in a source program, respective contents of which match each other;

a similar portions detector which detects similar portions in a source program, each containing a part that matches a part of another similar portion and another part that does not match, and each satisfying a criterion, on a basis of the matching portions detected by the matching portions detector; and a non-matching portion analyzer which analyzes the similar portion detected by the similar portions detector, and outputs an index indicating a degree of similarity between the similar portion and another similar portion that partially match each other.

[Supplementary Note 2] The source program analysis system according to Supplementary Note 1, in which the similar portions detector detects, among the matching portions detected by the matching portions detector, a set in which a plurality of matching portions are aligned in a same order of appearance without another matching portion being interposed, and detect similar portions each containing the plurality of matching portions contained in the same set and one or more non-matching portions interposed between the plurality of matching portions.

[Supplementary Note 3] The source program analysis system according to Supplementary Note 1 or 2, in which the non-matching portion analyzer calculates syntactic similarity that indicates a degree of similarity between a syntax of the non-matching portion in the similar portion detected by the similar portions detector and a non-matching portion of another similar portion that partially matches the similar portion.

[Supplementary Note 4] The source program analysis system according to Supplementary Note 3, in which the non-matching portion analyzer divides the non-matching portion in the similar portion detected by the similar portions detector into constituent elements, and calculate the syntactic similarity on a basis of a ratio of the constituent elements that are common to the non-matching portion in the another similar portion that partially matches the similar portion, with respect to the constituent elements of the non-matching portion in the similar portion.

[Supplementary Note 5] The source program analysis system according to Supplementary Note 3 or 4, in which the non-matching portion analyzer divides the non-matching portion in the similar portion detected by the similar portions detector into constituent elements, and outputs the syntactic structure of the constituent elements that are common to the non-matching portion in the another similar portion that partially matches the similar portion.

[Supplementary Note 6] The source program analysis system according to Supplementary Note 4 or 5, in which the non-matching portion analyzer divides the non-matching portion in the similar portion detected by the similar portions detector into constituent elements by analyzing the non-matching portion on a basis of a syntax tree.

[Supplementary Note 7] The source program analysis system according to any one of Supplementary Notes 1 to 6, further including a run unit indicator detector which detects an indicator that indicates a start or an end of a run unit in the source program, and wherein the similar portions detector detects a first indicator located immediately anterior to the matching portion detected by the matching portions detector and detected by the run unit indicator detector, and a second indicator located immediately posterior to the matching portion and detected by the run unit indicator detector, the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and the similar portions detector detects a similar portion containing the preceding portion, the matching portion, and the following portion.

[Supplementary Note 8] The source program analysis system according to Supplementary Note 7, wherein the similar portions detector detects a similar portion containing the preceding portion and the matching portion, and a similar portion containing the matching portion and the following portion.

[Supplementary Note 9] A source program analysis method including:

detecting matching portions in a source program, respective contents of which match each other;

detecting similar portions in the source program, each containing a part that matches a part of another similar portion and another part that does not match, on a basis of the detected matching portions, and satisfying a criterion; and analyzing the detected similar portions and outputting an index indicating a degree of similarity between the similar portion and another similar portion that partially match each other.

[Supplementary Note 10] A non-transitory recordable medium on which a program is recorded, the program being configured to cause a computer to realize:

a matching portion detection function including detecting matching portions in a source program, respective contents of which match each other;

a similar portion detection function including detecting similar portions in a source program, each containing a part that matches a part of another similar portion and another part that does not match, on a basis of the matching portions detected by the matching portion detection function, and satisfying a criterion; and a non-matching portion analysis function including analyzing the similar portion detected by the similar portion detection function, and outputting an index indicating a degree of similarity between the similar portion and another similar portion that partially match each other.

The present disclosure is based on Japanese Patent Application No. 2013-74623 filed on Mar. 29, 2013. The entirety of the description, claims, and drawings of Japanese Patent Application No. 2013-74623 is incorporated hereinto by reference.

REFERENCE SIGNS LIST

1 Source program
2 Analysis result
11 Matching portion detector
12 Run unit indicator detector
13 Similar portion detector
14 Non-matching portion analyzer
21 Matching portion information DB
22 Grammar definition information DB
23 Execution unit indicator information DB
24 Similar portion information DB
25 Non-matching structure information DB
100 Source program analysis system

The invention claimed is:

1. A source program analysis method executed by a controller coupled with a memory, comprising:

detecting and recording in the memory matching portions in a source program, respective contents of which match each other;

detecting and recording in the memory similar portions in the source program, each containing a part that matches a part of another similar portion and another part that does not match, on a basis of the detected matching portions, and satisfying a criterion;

analyzing the detected similar portion and outputting an index indicating a degree of similarity between the similar portion and another similar portion that partially match each other; and calculating a syntactic similarity that indicates a degree of similarity between a syntax of the non-matching portion in the similar portion and a non-matching portion of another similar portion that partially matches the similar portion, wherein the non-matching portion analyzer divides the non-matching portion in the similar portion detected by the similar portions detector into constituent elements, and calculates the syntactic similarity on a basis of a ratio of the constituent elements.

2. A source program analysis system, comprising:

a controller, which includes a processor device, a memory in communication with the processor device, a non-volatile data-storage device in communication with the processor device, and an input/output device in communication with the processor device, the memory having program code stored therein that, upon execution by the processor device, causes the system to function as:

a matching portions detector which detects, and records in the memory, matching portions in a source program recorded in the non-volatile data-storage device, respective contents of which match each other;

a similar portion detector which detects, and records in the memory, similar portions in the source program, each containing a part that matches a part of another similar portion and another part that does not match, and each satisfying a criterion, on a basis of the matching portions detected by the matching portions detector; and a non-matching portion analyzer which analyzes the similar portion detected by the similar portions detector, and outputs via the input/output device an index indicating a degree of similarity between the similar portion and another similar portion that partially match each other, wherein the non-matching portion analyzer calculates, and records in the memory, a syntactic similarity that indicates a degree of similarity between a syntax of the non-matching portion in the similar portion detected by the similar portions detector and a non-matching portion of another similar portion that partially matches the similar portion, and wherein the non-matching portion analyzer divides the non-matching portion in the similar portion detected by the similar portions detector into constituent elements, and calculates the syntactic similarity on a basis of a ratio of the constituent elements.

3. The source program analysis system according to claim 1, wherein
the similar portions detector detects, among the matching portions detected by the matching portions detector, a set in which a plurality of matching portions are aligned in a same order of appearance without another matching portion being interposed, and detect similar portions each containing the plurality of matching portions contained in the same set and one or more non-matching portions interposed between the plurality of matching portions.

4. The source program analysis system according to claim 3,
wherein the program code stored in the memory further causes the system to function as:
a run unit indicator detector which detects an indicator that indicates a start or an end of a run unit in the source program, and
wherein:
the similar portions detector detects a first indicator located immediately anterior to the matching portion detected by the matching portions detector and detected by the run unit indicator detector, and a second indicator located immediately posterior to the matching portion and detected by the run unit indicator detector,
the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and
the similar portions detector detects a similar portion containing the preceding portion, the matching portion, and the following portion.

5. The source program analysis system according to claim 1, wherein
the ratio is a ratio of the constituent elements common to the non-matching portion in the another similar portion that partially matches the similar portion with respect to the constituent elements of the non-matching portion in the similar portion.

6. The source program analysis system according to claim 5, wherein
the non-matching portion analyzer divides the non-matching portion in the similar portion detected by the similar portions detector into constituent elements, by analyzing the non-matching portion on a basis of a syntax tree.

7. The source program analysis system according to claim 6,
wherein the program code stored in the memory further causes the system to function as:
a run unit indicator detector which detects an indicator that indicates a start or an end of a run unit in the source program, and
wherein:
the similar portions detector detects a first indicator located immediately anterior to the matching portion detected by the matching portions detector and detected by the run unit indicator detector, and a second indicator located immediately posterior to the matching portion and detected by the run unit indicator detector,
the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and
the similar portions detector detects a similar portion containing the preceding portion, the matching portion, and the following portion.

8. The source program analysis system according to claim 5, wherein
the non-matching portion analyzer divides the non-matching portion in the similar portion detected by the similar portions detector into constituent elements, and outputs the syntactic structure of the constituent elements that are common to the non-matching portion in the another similar portion that partially matches the similar portion.

9. The source program analysis system according to claim 8,
wherein the program code stored in the memory further causes the system to function as:
a run unit indicator detector which detects an indicator that indicates a start or an end of a run unit in the source program, and
wherein:
the similar portions detector detects a first indicator located immediately anterior to the matching portion detected by the matching portions detector and detected by the run unit indicator detector, and a second indicator located immediately posterior to the matching portion and detected by the run unit indicator detector,
the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and
the similar portions detector detects a similar portion containing the preceding portion, the matching portion, and the following portion.

10. The source program analysis system according to claim 5,
wherein the program code stored in the memory further causes the system to function as:
a run unit indicator detector which detects an indicator that indicates a start or an end of a run unit in the source program, and
wherein:
the similar portions detector detects a first indicator located immediately anterior to the matching portion detected by the matching portions detector and detected by the run unit indicator detector, and a second indicator located immediately posterior to the matching portion and detected by the run unit indicator detector, the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and the similar portions detector detects a similar portion containing the preceding portion, the matching portion, and the following portion.

11. The source program analysis system according to claim 1, wherein the non-matching portion analyzer divides the non-matching portion in the similar portion detected by the similar portions detector into constituent elements, and outputs the syntactic structure of the constituent elements that are common to the non-matching portion in the another similar portion that partially matches the similar portion.

12. The source program analysis system according to claim 11, wherein the non-matching portion analyzer divides the non-matching portion in the similar portion detected by the similar portions detector into constituent elements, by analyzing the non-matching portion on a basis of a syntax tree.

13. The source program analysis system according to claim 11, wherein the program code stored in the memory further causes the system to function as:

a run unit indicator detector which detects an indicator that indicates a start or an end of a run unit in the source program, and wherein:

the similar portions detector detects a first indicator located immediately anterior to the matching portion detected by the matching portions detector and detected by the run unit indicator detector, and a second indicator located immediately posterior to the matching portion and detected by the run unit indicator detector, the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and the similar portions detector detects a similar portion containing the preceding portion, the matching portion, and the following portion.

14. The source program analysis system according to claim 1, wherein the program code stored in the memory further causes the system to function as:

a run unit indicator detector which detects an indicator that indicates a start or an end of a run unit in the source program, and wherein:

the similar portions detector detects a first indicator located immediately anterior to the matching portion detected by the matching portions detector and detected by the run unit indicator detector, and a second indicator located immediately posterior to the matching portion and detected by the run unit indicator detector, the similar portions detector extracts as preceding portion a section from a more posterior one of the first indicator in the source program and another matching portion immediately anterior to the matching portion, to the matching portion, and extracts as following portion a section from the matching portion to a more anterior one of the second indicator in the source program and another matching portion immediately posterior to the matching portion, and the similar portions detector detects a similar portion containing the preceding portion, the matching portion, and the following portion.

15. The source program analysis system according to claim 14, wherein the similar portions detector detects a similar portion containing the preceding portion and the matching portion, and a similar portion containing the matching portion and the following portion.

16. A non-transitory recordable medium on which a program is recorded, the program being configured to cause a computer to realize:

a matching portion detection function including detecting matching portions in a source program, respective contents of which match each other;

a similar portion detection function including detecting similar portions in a source program, each containing a part that matches a part of another similar portion and another part that does not match, on a basis of the matching portions detected by the matching portion detection function, and satisfying a criterion; and a non-matching portion analysis function including analyzing the similar portion detected by the similar portion detection function, and outputting an index indicating a degree of similarity between the similar portion and another similar portion that partially match each other, wherein the non-matching portion analysis function includes calculating a syntactic similarity that indicates a degree of similarity between a syntax of the non-matching portion in the similar portion detected by the similar portions detection function and a non-matching portion of another similar portion that partially matches the similar portion, and wherein the non-matching portion analyzer divides the non-matching portion in the similar portion detected by the similar portions detector into constituent elements, and calculates the syntactic similarity on a basis of a ratio of the constituent elements.

* * * * *